US009205837B2

(12) United States Patent
Kim

(10) Patent No.: US 9,205,837 B2
(45) Date of Patent: Dec. 8, 2015

(54) PARKING OPERATION CONTROL APPARATUS AND CONTROL METHOD THEREOF

(71) Applicant: MANDO CORPORATION, Pyeongtaek-si, Gyeonggi-do (KR)

(72) Inventor: Yong-Kil Kim, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/305,297

(22) Filed: Jun. 16, 2014

(65) Prior Publication Data

US 2015/0039185 A1 Feb. 5, 2015

(30) Foreign Application Priority Data

Aug. 5, 2013 (KR) .................. 10-2013-0092434

(51) Int. Cl.
*B60W 10/18* (2012.01)
*B60T 8/72* (2006.01)
(Continued)

(52) U.S. Cl.
CPC ............ *B60W 30/181* (2013.01); *B60W 10/10* (2013.01); *B60W 10/182* (2013.01); *B60W 10/20* (2013.01); *B60W 30/06* (2013.01); *B60T 7/045* (2013.01); *B60T 8/17551* (2013.01); *B60T 8/329* (2013.01); *B60T 8/72* (2013.01); *B60T 15/043* (2013.01); *B60T 2250/042* (2013.01);
(Continued)

(58) Field of Classification Search
CPC ............ B60T 7/00; B60T 7/02; B60T 7/045; B60T 7/047; B60T 7/08; B60T 7/085; B60T 8/1755; B60T 8/17551; B60T 8/329; B60T 15/00; B60T 15/04; B60T 15/041; B60T 15/043; B60T 2201/06; B60W 10/00; B60W 10/10; B60W 10/20; B60W 10/182
USPC ................. 701/36–44, 48, 51, 70, 72, 74, 78, 701/93–96, 300; 340/932.2, 933–943; 73/115.01, 115.07, 115.08, 121; 303/3, 303/13–17, 20, 146, 147, 160–170, 174; 188/265, 353
See application file for complete search history.

(56) References Cited

U.S. PATENT DOCUMENTS 4,708,406 A * 11/1987 Takagi et al. .............. 303/116.1
6,158,822 A * 12/2000 Shirai et al. .................... 303/3
(Continued)

FOREIGN PATENT DOCUMENTS

KR 1020110125378 A 11/2011

*Primary Examiner* — Thomas Tarcza
*Assistant Examiner* — Tyler J Lee
(74) *Attorney, Agent, or Firm* — Hauptman Ham, LLP

(57) ABSTRACT

Disclosed are a parking operation control apparatus and a control method thereof. The apparatus includes a first sensing unit to sense current wheel speed of an automobile in a parking release mode or a current front-wheel speed of the automobile in a parking operation mode, a first controller to receive the current wheel speed and output the same and to store a reference wheel-speed range, a second sensing unit to sense the current wheel speed from the first controller, a first judgment unit to judge whether the current wheel speed deviates from the reference wheel-speed range, or whether the current wheel speed sensed by the second sensing unit is not output, and a regulation unit to regulate the current wheel speed to conform to the reference wheel-speed range when the first judgment unit judges that the current wheel speed deviates from the reference wheel-speed range or is not output.

17 Claims, 18 Drawing Sheets

(51) Int. Cl.
    *B60W 30/18*     (2012.01)
    *B60W 10/10*     (2012.01)
    *B60W 10/20*     (2006.01)
    *B60W 30/06*     (2006.01)
    *B60T 8/32*     (2006.01)
    *B60T 15/04*     (2006.01)
    *B60T 7/04*     (2006.01)
    *B60T 8/1755*     (2006.01)

(52) U.S. Cl.
    CPC ..... *B60W 2520/125* (2013.01); *B60W 2520/14* (2013.01); *B60W 2520/28* (2013.01); *B60W 2720/10* (2013.01); *B60W 2720/125* (2013.01); *B60W 2720/14* (2013.01); *B60W 2720/28* (2013.01)

(56) References Cited

U.S. PATENT DOCUMENTS

| | | | |
|---|---|---|---|
| 2007/0029876 A1* | 2/2007 | Makishima et al. | 303/191 |
| 2007/0192002 A1* | 8/2007 | Iyoda | 701/37 |
| 2008/0294319 A1* | 11/2008 | Baijens et al. | 701/70 |
| 2013/0138316 A1* | 5/2013 | Koyama | 701/70 |
| 2015/0039199 A1* | 2/2015 | Kikuchi | 701/70 |

* cited by examiner

PARKING OPERATION CONTROL APPARATUS AND CONTROL METHOD THEREOF

CROSS-REFERENCE TO RELATED APPLICATION

This application claims the benefit of Korean Patent Applications No. 2013-0092434, filed on Aug. 5, 2013 in the Korean Intellectual Property Office, the disclosure of which is incorporated herein by reference.

BACKGROUND

1. Field

Embodiments of the present invention relate to a parking operation control apparatus and a control method thereof.

2. Description of the Related Art

Generally, conventional parking operation devices are provided to park an automobile at a desired position using an electronic parking brake system upon parking.

The electronic parking brake system allows a driver to operate or release a parking brake via simplified switch operation and to achieve braking stability in an emergency situation.

In addition, when the user has difficulty in driving or parking the automobile due to failure of the electronic parking brake system, driving or parking may be implemented via operation of a release lever.

Recently, studies on an improved parking operation control apparatus, which may enhance parking efficiency, convenience and stability by stabilizing an automobile under occurrence of malfunction of the electronic parking brake system and a control method thereof have been continuously conducted.

SUMMARY

It is an aspect of the present invention to provide a parking operation control apparatus and a control method thereof, which may regulate at least one current wheel speed to conform to a reference wheel-speed range under a situation in which the at least one current wheel speed is abnormal, thereby enhancing parking efficiency, convenience and stability.

It is another aspect of the present invention to provide a parking operation control apparatus and a control method thereof, which may regulate current front-wheel drive shaft rotation information to conform to a wheel-speed range per reference wheel drive shaft rotation information under a situation in which the current front-wheel drive shaft rotation information is abnormal, thereby enhancing parking efficiency, convenience and stability.

It is another aspect of the present invention to provide a parking operation control apparatus and a control method thereof, which may regulate current final reduction to conform to a reference final reduction range under a situation in which the current final reduction is abnormal, thereby enhancing parking efficiency, convenience and stability.

It is another aspect of the present invention to provide a parking operation control apparatus and a control method thereof, which may regulate a current yaw rate and current lateral acceleration of an automobile to conform to a reference yaw-rate range and a reference lateral-acceleration range under a situation in which the current yaw rate and the current lateral acceleration are abnormal, thereby enhancing parking efficiency, convenience and stability.

It is another aspect of the present invention to provide a parking operation control apparatus and a control method thereof, which may reduce parking force of an automobile to conform to a first parking-force level range so as to stabilize the automobile under a situation in which a current yaw rate and current lateral acceleration of the automobile are abnormal, thereby enhancing parking efficiency, convenience and stability.

It is a further aspect of the present invention to provide a parking operation control apparatus and a control method thereof, which may increase parking force of an automobile to conform to a second parking-force level range and maintain the increased parking force of the automobile conforming to the second parking-force level range when current speed-reduction of the automobile reaches a target speed-reduction range so as to stabilize the automobile under a situation in which the current speed-reduction of the automobile is abnormal, thereby enhancing parking efficiency, convenience and stability.

Additional aspects of the invention will be set forth in part in the description which follows and, in part, will be obvious from the description, or may be learned by practice of the invention.

In accordance with one embodiment, a parking operation control apparatus includes a first sensing unit to sense at least one current wheel speed among a current front-wheel speed and a current rear-wheel speed of an automobile in a parking release mode of a parking operation device, or to sense a current front-wheel speed of the automobile in a parking operation mode of the parking operation device, a first controller to receive the at least one current wheel speed sensed by the first sensing unit and to output the at least one current wheel speed, the first controller storing a reference wheel-speed range corresponding to a preset reference front-wheel speed range and a preset reference rear-wheel speed range, a second sensing unit to sense the at least one current wheel speed output from the first controller, a first judgment unit to judge whether or not the at least one current wheel speed sensed by the first sensing unit deviates from the reference wheel-speed range, or to judge whether or not the at least one current wheel speed sensed by the second sensing unit is not yet output, and a regulation unit to regulate the at least one current wheel speed to conform to the reference wheel-speed range when the first judgment unit judges that the at least one current wheel speed deviates from the reference wheel-speed range or that the at least one current wheel speed is not yet output.

The first sensing unit may further sense current final reduction of the automobile in the parking release mode, the first controller may further store a preset reference final reduction range, the first judgment unit may further judge whether or not the current final reduction of the automobile sensed by the first sensing unit deviates from the reference final reduction range, and the regulation unit may regulate the current final reduction to conform to the reference final reduction range when the first judgment unit judges that the current final reduction of the automobile deviates from the reference final reduction range.

The first sensing unit may sense a current yaw rate and current lateral acceleration, the first controller may further store a preset reference yaw-rate range and a preset reference lateral-acceleration range, the first judgment unit may further judge whether or not the current yaw rate and the current lateral acceleration of the automobile sensed by the first sensing unit deviate from the reference yaw-rate range and the reference lateral-acceleration range, and the regulation unit may regulate the current yaw rate and the current lateral acceleration of the automobile to conform to the reference yaw-rate range and the reference lateral-acceleration range when the first judgment unit judges that the current yaw rate and the current lateral acceleration of the automobile deviate from the reference yaw-rate range and the reference lateral-acceleration range.

The first controller may further store a preset first parking-force level range, and the regulation unit may reduce parking force of the automobile to conform to the first parking-force level range so as to stabilize the automobile when the first judgment unit judges that the current yaw rate and the current lateral acceleration of the automobile deviate from the reference yaw-rate range and the reference lateral-acceleration range.

The first sensing unit may further sense current speed-reduction of the automobile, the first controller may further store a preset second parking-force level range and a target speed-reduction range, and the regulation unit may increase parking force of the automobile to conform to the second parking-force level range and maintain the increased parking force of the automobile conforming to the second parking-force level range when current speed-reduction of the automobile reaches the target speed-reduction range so as to stabilize the automobile when the first judgment unit judges that the current yaw rate and the current lateral acceleration of the automobile fall within the reference yaw-rate range and the reference lateral-acceleration range.

The parking operation control apparatus may further include a third sensing unit to sense at least one current wheel drive shaft rotation information among current front-wheel drive shaft rotation information and current rear-wheel drive shaft rotation information of the automobile when the first judgment unit judges that the at least one current wheel speed deviates from the reference wheel-speed range or that the at least one current wheel speed is not yet output, a second controller to receive the at least one current wheel drive shaft rotation information sensed by the third sensing unit, the second controller storing reference wheel drive shaft rotation information corresponding to preset reference front-wheel drive shaft rotation information and preset reference rear-wheel drive shaft rotation information, the second controller further storing a wheel-speed range on a per reference wheel drive shaft rotation information basis, and a second judgment unit to judge whether or not the at least one current wheel drive shaft rotation information sensed by the third sensing unit deviates from the reference wheel drive shaft rotation information, and the regulation unit may regulate the at least one current wheel drive shaft rotation information to conform to the wheel speed range on a per reference wheel drive shaft rotation information basis when the second judgment unit judges that the at least one current wheel drive shaft rotation information deviates from the reference wheel drive shaft rotation information.

In accordance with another embodiment, a parking operation control method includes first sensing operation implemented by a first sensing unit to sense at least one current wheel speed among a current front-wheel speed and a current rear-wheel speed of an automobile in a parking release mode of a parking operation device, second sensing operation implemented by a second sensing unit to sense the at least one current wheel speed output from a first controller, first judgment operation implemented by a first judgment unit to judge whether or not the at least one current wheel speed sensed by the first sensing unit deviates from a reference wheel-speed range set in the first controller, or to judge whether or not the at least one current wheel speed sensed by the second sensing unit is not yet output, and first regulation operation implemented by a regulation unit to regulate the at least one current wheel speed to conform to the reference wheel-speed range when the first judgment unit judges that the at least one current wheel speed deviates from the reference wheel-speed range or that the at least one current wheel speed is not yet output.

The parking operation control method may further include fourth sensing operation implemented by a third sensing unit to sense at least one current wheel drive shaft rotation information among current front-wheel drive shaft rotation information and current rear-wheel drive shaft rotation information of the automobile when the first judgment unit judges that the at least one current wheel speed deviates from the reference wheel-speed range or that the at least one current wheel speed is not yet output, third judgment operation implemented by a second judgment unit to judge whether or not the at least one current wheel drive shaft rotation information sensed by the third sensing unit deviates from the reference wheel drive shaft rotation information set in a second controller, and third regulation operation implemented by the regulation unit to regulate the at least one current wheel drive shaft rotation information to conform to a wheel speed range per reference wheel drive shaft rotation information set in the second controller when the second judgment unit judges that the at least one current wheel drive shaft rotation information deviates from the reference wheel drive shaft rotation information.

In accordance with another embodiment, a parking operation control method includes third sensing operation implemented by a first sensing unit to sense a current front-wheel speed of an automobile in a parking operation mode of a parking operation device, second judgment operation implemented by a first judgment unit to judge whether or not the current front-wheel speed sensed by the first sensing unit deviates from a reference front-wheel speed range set in a first controller, and second regulation operation implemented by a regulation unit to regulate the current front-wheel speed to conform to the reference front-wheel speed range when the first judgment unit judges that the current front-wheel speed deviates from the reference front-wheel speed range.

The parking operation control method may further include fifth sensing operation implemented by a third sensing unit to sense current front-wheel drive shaft rotation information of the automobile when the first judgment unit judges that the current front-wheel speed deviates from the reference front-wheel speed range, fourth judgment operation implemented by a second judgment unit to judge whether or not the current front-wheel drive shaft rotation information sensed by the third sensing unit deviates from the reference front-wheel drive shaft rotation information set in a second controller, and fourth regulation operation implemented by the regulation unit to regulate the current front-wheel drive shaft rotation information to conform to a wheel speed range per reference wheel drive shaft rotation information set in the second controller when the second judgment unit judges that the current front-wheel drive shaft rotation information deviates from the reference front-wheel drive shaft rotation information.

In accordance with a further embodiment, a parking operation control method includes fourth sensing operation implemented by a first sensing unit to sense current final reduction of an automobile in a parking release mode of a parking operation device, first judgment operation implemented by a first judgment unit to judge whether or not the current final reduction of the automobile sensed by the first sensing unit deviates from a reference final reduction range set in a first controller in a parking operation mode of the parking operation device, and fifth regulation operation implemented by a regulation unit to regulate the current final reduction to conform to the reference final reduction range when the first judgment unit judges that the current final reduction of the automobile deviates from the reference final reduction range.

The parking operation control method may further include seventh sensing operation implemented by the first sensing unit to sense a current yaw rate and current lateral acceleration, sixth judgment operation implemented by the first judgment unit to judge whether or not the current yaw rate and the current lateral acceleration of the automobile sensed by the first sensing unit deviate from a reference yaw-rate range and a reference lateral-acceleration range, and sixth regulation operation implemented by the regulation unit to regulate the current yaw rate and the current lateral acceleration of the automobile to conform to the reference yaw-rate range and the reference lateral-acceleration range when the first judgment unit judges that the current yaw rate and the current lateral acceleration of the automobile deviate from the reference yaw-rate range and the reference lateral-acceleration range.

In the sixth regulation operation, the regulation unit may reduce parking force of the automobile to conform to a first parking-force level range set in the first controller so as to stabilize the automobile when the first judgment unit judges that the current yaw rate and the current lateral acceleration of the automobile deviate from the reference yaw-rate range and the reference lateral-acceleration range.

The parking operation control method may further include eighth sensing operation implemented by the first sensing unit to sense current speed-reduction of the automobile, seventh judgment operation implemented by the first judgment unit to judge whether or not the current yaw rate and the current lateral acceleration of the automobile deviate from the reference yaw-rate range and the reference lateral-acceleration range, and seventh regulation operation implemented by the regulation unit to increase parking force of the automobile to conform to a second parking-force level range set in the first controller and to maintain the increased parking force of the automobile conforming to the second parking-force level range when the current speed-reduction of the automobile reaches a target speed-reduction range set in the first controller so as to stabilize the automobile when the first judgment unit judges that the current yaw rate and the current lateral acceleration of the automobile fall within the reference yaw-rate range and the reference lateral-acceleration range.

The parking operation control method may further include ninth sensing operation implemented by the first sensing unit to sense a current yaw-rate and current lateral acceleration, eighth judgment operation implemented by the first judgment unit to judge whether or not the current yaw rate and the current lateral acceleration of the automobile sensed by the first sensing unit deviate from a reference yaw-rate range and a reference lateral-acceleration range, and eighth regulation operation implemented by the regulation unit to regulate the current yaw rate and the current lateral acceleration of the automobile to conform to the reference yaw-rate range and the reference lateral-acceleration range when the first judgment unit judges that the current yaw rate and the current lateral acceleration of the automobile deviate from the reference yaw-rate range and the reference lateral-acceleration range.

In the eighth regulation operation, the regulation unit may reduce parking force of the automobile to conform to a first parking-force level range set in the first controller so as to stabilize the automobile when the first judgment unit judges that the current yaw rate and the current lateral acceleration of the automobile deviate from the reference yaw-rate range and the reference lateral-acceleration range.

The parking operation control method may further include tenth sensing operation implemented by the first sensing unit to sense current speed-reduction of the automobile, ninth judgment operation implemented by the first judgment unit to judge whether or not the current yaw rate and the current lateral acceleration of the automobile fall within the reference yaw-rate range and the reference lateral-acceleration range, and ninth regulation operation implemented by the regulation unit to increase parking force of the automobile to conform to a second parking-force level range set in the first controller and to maintain the increased parking force of the automobile conforming to the second parking-force level range when the current speed-reduction of the automobile reaches a target speed-reduction range set in the first controller so as to stabilize the automobile when the first judgment unit judges that the current yaw rate and the current lateral acceleration of the automobile fall within the reference yaw-rate range and the reference lateral-acceleration range.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings.

Figure 1:
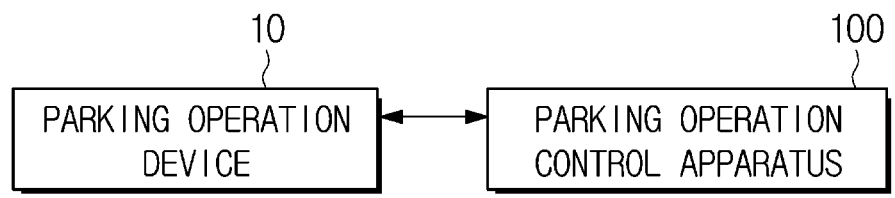
FIG. 1 is a block diagram showing connection of a parking operation device and a parking operation control apparatus according to a first embodiment of the present invention.
Figure 2:
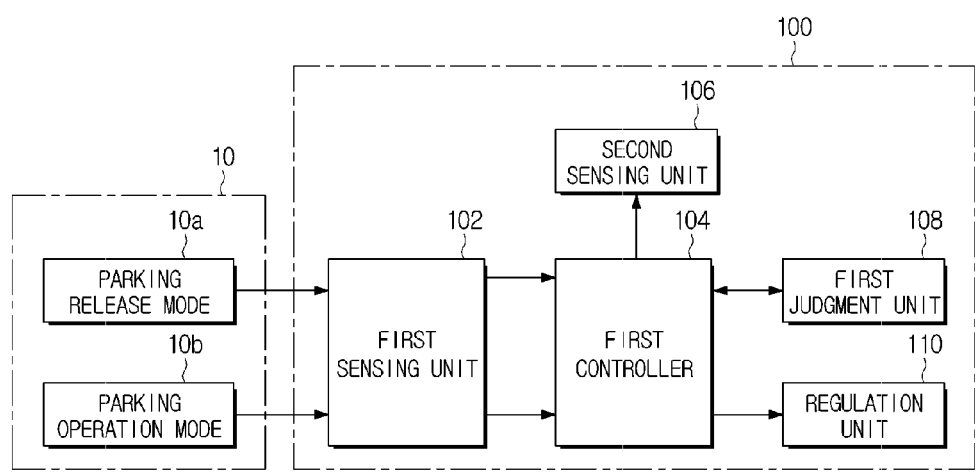
FIG. 2 is a block diagram showing one example of the parking operation control apparatus shown in FIG. 1.

FIG. 1 is a block diagram showing connection of a parking operation device and a parking operation control apparatus according to a first embodiment of the present invention and FIG. 2 is a block diagram showing one example of the parking operation control apparatus shown in FIG. 1.

Referring to FIGS. 1 and 2, the parking operation control apparatus 100 according to the first embodiment of the present invention includes a first sensing unit 102, a first controller 104, a second sensing unit 106, a first judgment unit 108 and a regulation unit 110.

The first sensing unit 102 serves to sense at least one current wheel speed among a current front-wheel speed and a current rear-wheel speed of an automobile in a parking release mode 10a of the parking operation device 10.

In addition, the first sensing unit 102 serves to sense a current front-wheel speed of the automobile in a parking operation mode 10b of the parking operation device 10.

In this case, although not shown, the first sensing unit 102 may include a wheel-speed sensor (not shown) without being limited thereto and all wheel-speed sensing means to sense a wheel speed may be possible.

The first controller 104 receives the at least one current wheel speed sensed by the first sensing unit 102 to output the same. The first controller 104 stores a reference wheel-speed range corresponding to a preset reference front-wheel speed range and a preset reference rear-wheel speed range.

In addition, the first controller 104 may receive a current front-wheel speed sensed by the first sensing unit 102 and store a preset reference front-wheel speed range.

The second sensing unit 106 serves to sense the at least one current wheel speed output from the first controller 104.

In this case, although not shown, the second sensing unit 106 may include a wheel-speed sensor (not shown) without being limited thereto and all wheel-speed sensing means to sense a wheel speed may be possible.

The first judgment unit 108 serves to judge whether or not the at least one current wheel speed sensed by the first sensing unit 102 deviates from the reference wheel-speed range, or whether or not the at least one current wheel speed sensed by the second sensing unit 106 is not yet output.

In addition, the first judgment unit 108 may serve to judge whether or not the current front-wheel speed sensed by the first sensing unit 102 deviates from the reference front-wheel speed range.

The regulation unit 110 may serve to regulate the at least one current wheel speed to conform to the reference wheel-speed range when the first judgment unit 108 judges that the at least one current wheel speed deviates from the reference wheel-speed range or that the at least one current wheel speed is not yet output.

In addition, the regulation unit 110 may serve to regulate the current front-wheel speed to conform to the reference front-wheel speed range when the first judgment unit 108 judges that the current front-wheel speed deviates from the reference front-wheel speed range.

In this case, although not shown, the first controller 104, the first judgment unit 108 and the regulation unit 110 may include a general Electronic Control Unit (ECU) (not shown) or a general Micro Control Unit (MCU) (not shown). The ECU is a main computer applied to the automobile and functions to control and judge general operations and to regulate a wheel speed. The MCU includes a processor, a memory and an input/output device in a single chip and functions to control and judge general operations and to regulate a wheel speed. Of course, the disclosure is not limited thereto and all control means, judgment means and regulation means which may control and judge general operations of the automobile and regulate a wheel speed may be possible.

Here, the first controller 104, the first judgment unit 108 and the regulation unit 110 may constitute an integrated ECU or MCU, or may be discrete ECUs or MCUs.

A parking operation control method to control a parking operation using the parking operation control apparatus 100 according to the first embodiment of the present invention will be described below with reference to FIGS. 3 and 4.

Figure 3:
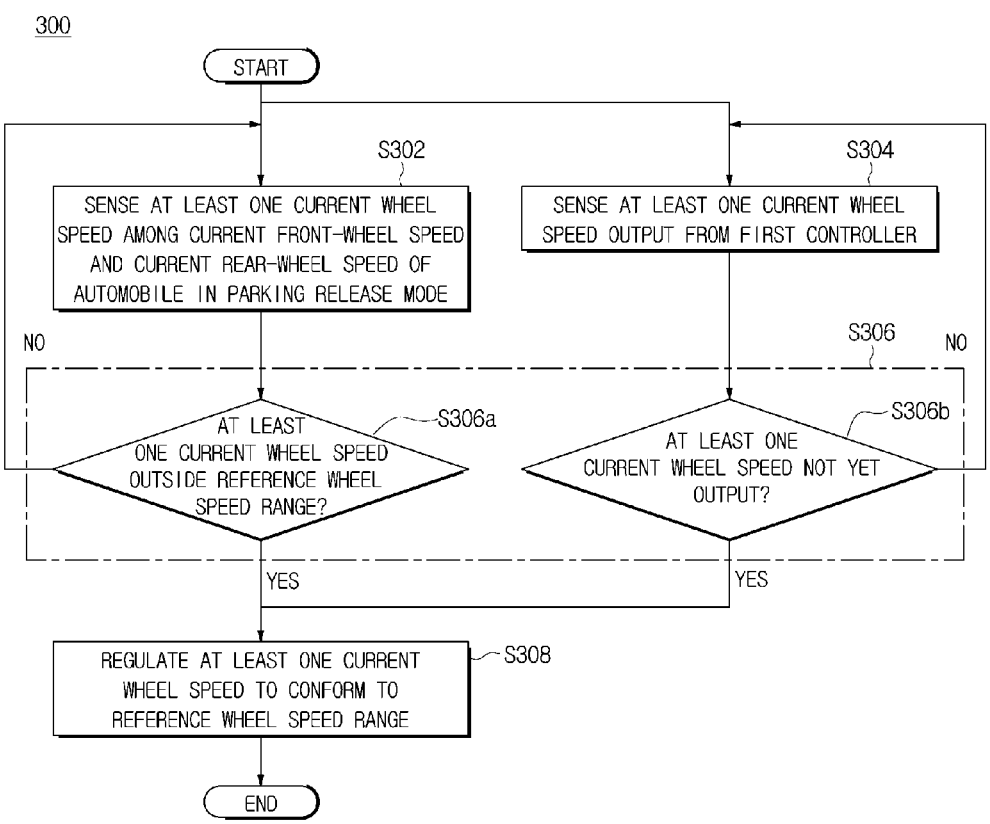
FIG. 3 is a flowchart showing one example of a parking operation control method of the parking operation control apparatus according to the first embodiment of the present invention.
Figure 4:
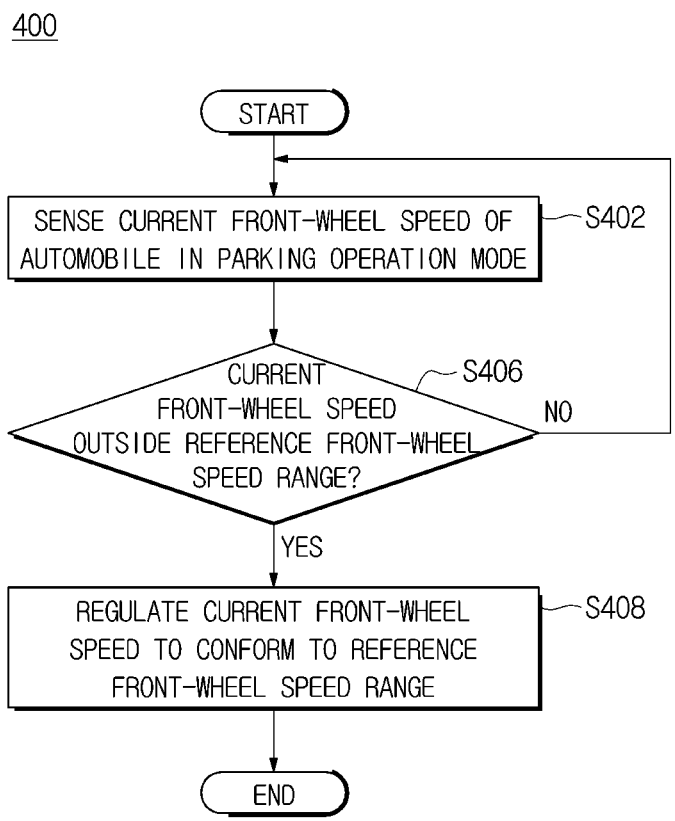
FIG. 4 is a flowchart showing another example of a parking operation control method of the parking operation control apparatus according to the first embodiment of the present invention.

FIG. 3 is a flowchart showing one example of a parking operation control method of the parking operation control apparatus according to the first embodiment of the present invention and FIG. 4 is a flowchart showing another example of a parking operation control method of the parking operation control apparatus according to the first embodiment of the present invention.

First, referring to FIG. 3, the parking operation control method 300 of the parking operation control apparatus (100 in FIGS. 1 and 2) according to the first embodiment of the present invention includes first sensing operation S302, second sensing operation S304, first judgment operation S306 and first regulation operation S308.

In the first sensing operation S302, the first sensing unit (102 in FIG. 2) senses at least one current wheel speed among a current front-wheel speed and a current rear-wheel speed of the automobile in the parking release mode (10a in FIG. 2) of the parking operation device (10 in FIG. 2).

Thereafter, in the second sensing operation S304, the second sensing unit (106 in FIG. 2) senses the at least one current wheel speed output from the first controller (104 in FIG. 2).

Thereafter, in the first judgment operation S306, the first judgment unit (108 in FIG. 2) judges whether or not the at least one current wheel speed sensed by the first sensing unit (102 in FIG. 2) deviates from a reference wheel-speed range set in the first controller (104 in FIG. 2) (S306a), or the first judgment unit (108 in FIG. 2) judges whether or not the at least one current wheel speed sensed by the second sensing unit (106 in FIG. 2) is not yet output (S306b).

Finally, in the first regulation operation S308, the regulation unit (110 in FIG. 2) regulates the at least one current wheel speed to conform to the reference wheel-speed range when the first judgment unit (108 in FIG. 2) judges that the at least one current wheel speed deviates from the reference wheel-speed range or that the at least one current wheel speed is not yet output.

On the other hand, referring to FIG. 4, a parking operation control method 400 of the parking operation control apparatus (100 in FIGS. 1 and 2) according to the first embodiment of the present invention includes third sensing operation S402, second judgment operation S406 and second regulation operation S408.

First, in the third sensing operation S402, the first sensing unit (102 in FIG. 2) senses a current front-wheel speed of the automobile in the parking operation mode (10b in FIG. 2) of the parking operation device (10 in FIG. 2).

Thereafter, in the second judgment operation S406, the first judgment unit (108 in FIG. 2) judges whether or not the current front-wheel speed sensed by the first sensing unit (102 in FIG. 2) deviates from a reference front-wheel speed range set in the first controller (104 in FIG. 2).

Finally, in the second regulation operation S408, the regulation unit (110 in FIG. 2) regulates the current front-wheel speed to conform to the reference front-wheel speed range when the first judgment unit (108 in FIG. 2) judges that the current front-wheel speed deviates from the reference front-wheel speed range.

As described above, according to the first embodiment of the present invention, the parking operation control apparatus 100 includes the first sensing unit 102, the first controller 104, the second sensing unit 106, the first judgment unit 108 and the regulation unit 110 and the control methods 300 and 400 thereof includes the first sensing operation S302, the second sensing operation S304, the first judgment operation S306 and the first regulation operation S308 or the third sensing operation S402, the second judgment operation S406 and the second regulation operation S408.

Accordingly, the parking operation control apparatus 100 and the control methods 300 and 400 thereof according to the first embodiment of the present invention may regulate at least one current wheel speed to conform to a reference wheel-speed range when the at least one current wheel speed deviates from the reference wheel-speed range or is not yet output.

In this way, the parking operation control apparatus 100 and the control methods 300 and 400 thereof according to the first embodiment of the present invention may enhance parking efficiency, convenience and stability by regulating at least one current wheel speed to conform to a reference wheel-speed range even under a situation in which the current wheel speed is abnormal.

Figure 5:
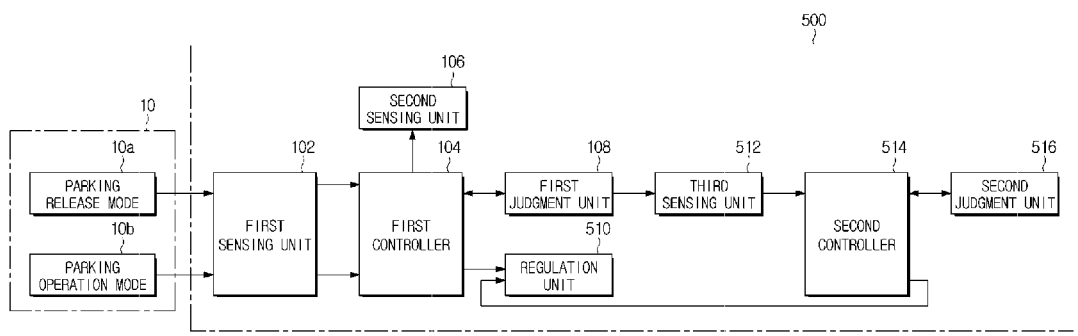
FIG. 5 is a block diagram showing one example of a parking operation control apparatus according to a second embodiment of the present invention.

FIG. 5 is a block diagram showing one example of a parking operation control apparatus according to a second embodiment of the present invention.

Referring to FIG. 5, the parking operation control apparatus 500 according to the second embodiment of the present invention includes the first sensing unit 102, the first controller 104, the first judgment unit 108 and the regulation unit 510 in the same manner as the parking operation control apparatus (100 in FIG. 2) according to the first embodiment.

Functions of and connection relationships between the respective components of the parking operation control apparatus 500 according to the second embodiment of the present invention are equal to functions of and connection relationships between the respective components of the parking operation control apparatus (100 in FIG. 2) according to the first embodiment and, thus, an additional description thereof will be omitted below.

Here, the parking operation control apparatus 500 according to the second embodiment of the present invention further includes a third sensing unit 512, a second controller 514 and a second judgment unit 516.

The third sensing unit 512 serves to sense at least one current wheel drive shaft rotation information among current front-wheel drive shaft rotation information and current rear-wheel drive shaft rotation information of the automobile when the first judgment unit 108 judges that at least one current wheel speed deviates from a reference wheel-speed range or that at least one current wheel speed is not yet output.

In this case, the third sensing unit 512, although not shown, may include a rotation sensor (not shown) to sense rotation of a wheel drive shaft without being limited thereto, and all rotation sensing means to sense rotation of a wheel drive shaft may be possible.

The second controller 514 receives the at least one current wheel drive shaft rotation information sensed by the third sensing unit 512. The second controller 514 stores reference wheel drive shaft rotation information corresponding to preset reference front-wheel drive shaft rotation information and preset reference rear-wheel drive shaft rotation information. The second controller 514 further stores a wheel-speed range on a per reference wheel drive shaft rotation information basis.

The second judgment unit 516 serves to judge whether or not the at least one current wheel drive shaft rotation information sensed by the third sensing unit 512 deviates from the reference wheel drive shaft rotation information.

Here, the regulation unit 510 may serve to regulate the at least one current wheel drive shaft rotation information to conform to a wheel speed range on a per reference wheel drive shaft rotation information basis when the second judgment unit 516 judges that the at least one current wheel drive shaft rotation information deviates from the reference wheel drive shaft rotation information.

In this case, although not shown, the second controller 514, the second judgment unit 516 and the regulation unit 510 may include a general Electronic Control Unit (ECU) (not shown) or a general Micro Control Unit (MCU) (not shown). The ECU is a main computer applied to the automobile and functions to control and judge general operations and to regulate rotation of a wheel drive shaft. The MCU includes a processor, a memory and an input/output device in a single chip and functions to control and judge general operations and to regulate rotation of a wheel drive shaft. Of course, the disclosure is not limited thereto and all control means, judgment means and regulation means which may control and judge general operations of the automobile and regulate rotation of a wheel drive shaft may be possible.

Here, the second controller 514, the second judgment unit 516 and the regulation unit 510 may constitute an integrated ECU or MCU, or may be discrete ECUs or MCUs.

A parking operation control method to control a parking operation using the parking operation control apparatus 500 according to the second embodiment of the present invention will be described below with reference to FIGS. 6 and 7.

Figure 6:
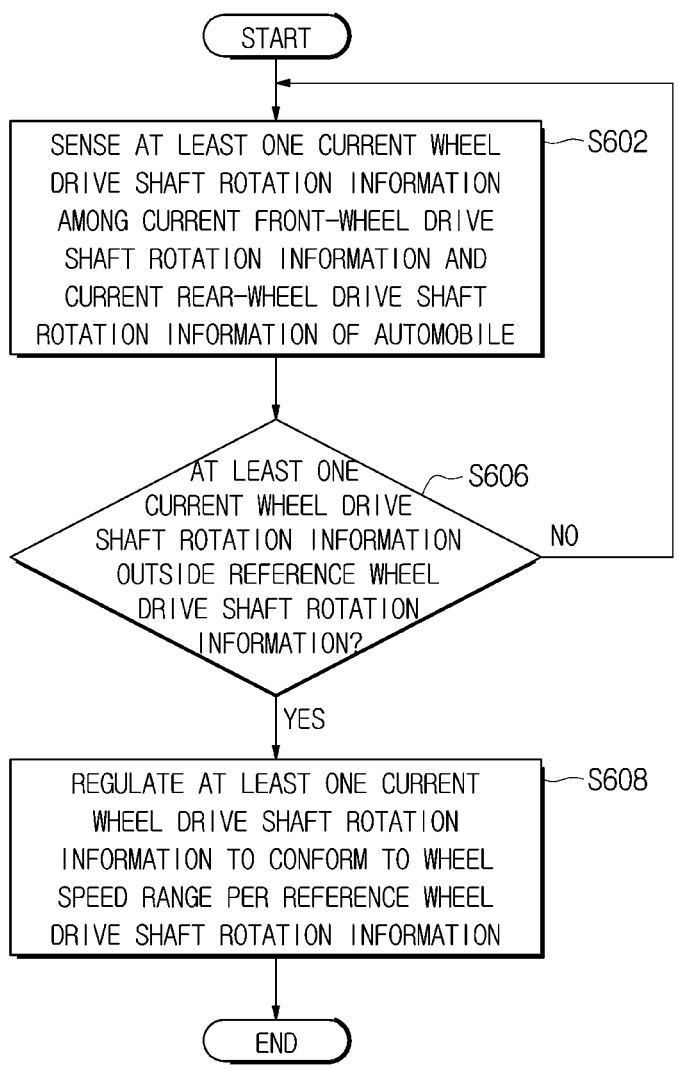
FIG. 6 is a flowchart showing one example of a parking operation control method of the parking operation control apparatus according to the second embodiment of the present invention.
Figure 7:
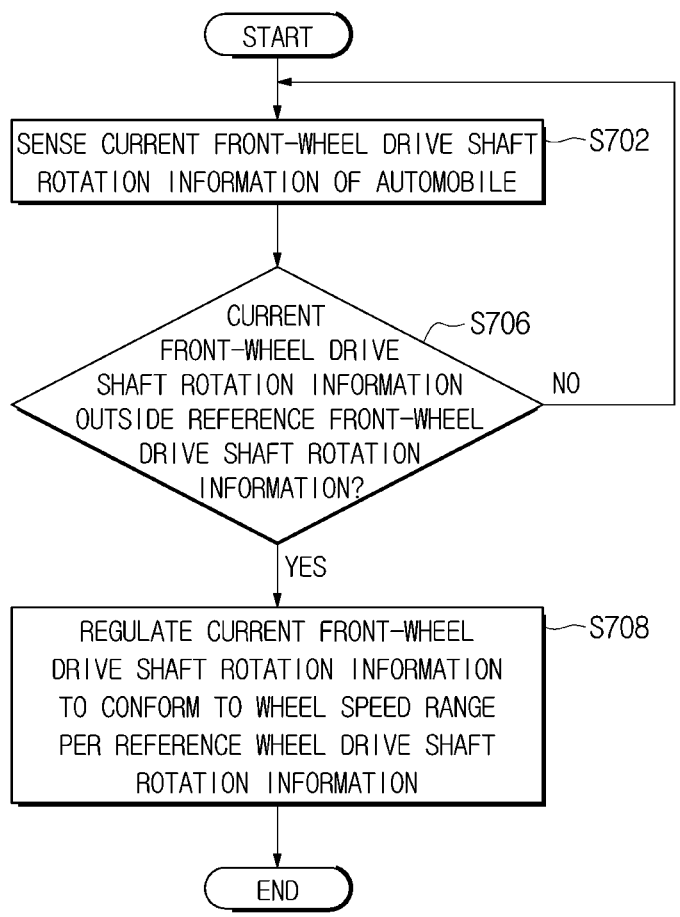
FIG. 7 is a flowchart showing another example of a parking operation control method of the parking operation control apparatus according to the second embodiment of the present invention.

FIG. 6 is a flowchart showing one example of a parking operation control method of the parking operation control apparatus according to the second embodiment of the present invention and FIG. 7 is a flowchart showing another example of a parking operation control method of the parking operation control apparatus according to the second embodiment of the present invention.

Referring to FIGS. 6 and 7, in the same manner as the parking operation control methods (300 and 400 in FIGS. 3 and 4) of the parking operation control apparatus (100 in FIG. 2) according to the first embodiment, the parking operation control methods 600 and 700 of the parking operation control apparatus (500 in FIG. 5) according to the second embodiment of the present invention include the first sensing operation (S302 in FIG. 3), the second sensing operation (S304 in FIG. 3), the first judgment operation (S306 in FIG. 3) and the first regulation operation (S308 in FIG. 3) or the third sensing operation (S402 in FIG. 4), the second judgment operation (S406 in FIG. 4) and the second regulation operation (S408 in FIG. 4).

Functions of and connection relationships between the respective operations corresponding to the parking operation control methods 600 and 700 of the parking operation control apparatus 500 according to the second embodiment of the present invention are equal to functions of and connection relationships between the respective operations corresponding to the parking operation control methods (300 and 400 in FIGS. 3 and 4) of the parking operation control apparatus (100 in FIG. 2) according to the first embodiment and, thus, an additional description thereof will be omitted below.

Here, the parking operation control methods 600 and 700 of the parking operation control apparatus (500 in FIG. 5) according to the second embodiment of the present invention further includes fourth sensing operation S602, third judgment operation S606 and third regulation operation S608, or fifth sensing operation S702, fourth judgment operation S706 and fourth regulation operation S708.

First, referring to FIG. 6, the parking operation control method 600 of the parking operation control apparatus (500 in FIG. 5) according to the second embodiment of the present invention further includes the fourth sensing operation S602, the third judgment operation S606 and the third regulation operation S608.

In the fourth sensing operation S602, the third sensing unit (512 in FIG. 5) senses at least one current wheel drive shaft rotation information among current front-wheel drive shaft rotation information and current rear-wheel drive shaft rotation information when the first judgment unit (108 in FIG. 2) judges that the at least one current wheel speed deviates from the reference wheel-speed range or that the at least one current wheel speed is not yet output (S306 in FIG. 3).

Thereafter, in the third judgment operation S606, the second judgment unit (516 in FIG. 5) judges whether or not the at least one current wheel drive shaft rotation information sensed by the third sensing unit (512 in FIG. 5) deviates from reference wheel drive shaft rotation information set in the second controller (514 in FIG. 5).

Finally, in the third regulation operation S608, the regulation unit (510 in FIG. 5) regulates the at least one current wheel drive shaft rotation information to conform to a wheel speed range per reference wheel drive shaft rotation information set in the second controller (514 in FIG. 5) when the second judgment unit (516 in FIG. 5) judges that the at least one current wheel drive shaft rotation information deviates from the reference wheel drive shaft rotation information.

On the other hand, referring to FIG. 7, the parking operation control method 700 of the parking operation control apparatus (500 in FIG. 5) according to the second embodiment of the present invention further includes the fifth sensing operation S702, the fourth judgment operation S706 and the fourth regulation operation S708.

In the fifth sensing operation S702, the third sensing unit (512 in FIG. 5) senses current front-wheel drive shaft rotation information of the automobile when the first judgment unit (108 in FIG. 2) judges that the current front-wheel speed deviates from the reference front-wheel speed range (S406 in FIG. 4).

Thereafter, in the fourth judgment operation S706, the second judgment unit (516 in FIG. 5) judges whether or not the current front-wheel drive shaft rotation information sensed by the third sensing unit (512 in FIG. 5) deviates from reference front-wheel drive shaft rotation information set in the second controller (514 in FIG. 5).

Finally, in the fourth regulation operation S708, the regulation unit (510 in FIG. 5) regulates the current front-wheel drive shaft rotation information to conform to a wheel-speed range per reference wheel drive shaft rotation information set in the second controller (514 in FIG. 5) when the second judgment unit (516 in FIG. 5) judges that the current front-wheel drive shaft rotation information deviates from the reference front-wheel drive shaft rotation information.

As described above, according to the second embodiment of the present invention, the parking operation control apparatus 500 includes the first sensing unit 102, the first controller 104, the second sensing unit 106, the first judgment unit 108, the regulation unit 510, the third sensing unit 512, the second controller 514 and the second judgment unit 516 and the control methods 600 and 700 thereof include the first sensing operation S302, the second sensing operation S304, the first judgment operation S306, the first regulation operation S308, the fourth sensing operation S602, the third judgment operation S606 and the third regulation operation S608 or the third sensing operation S402, the second judgment operation S406, the second regulation operation S408, the fifth sensing operation S702, the fourth judgment operation S706 and the fourth regulation operation S708.

Accordingly, the parking operation control apparatus 500 and the control methods 600 and 700 thereof according to the second embodiment of the present invention may regulate current front-wheel drive shaft rotation information to conform to a wheel-speed range per reference wheel drive shaft rotation information when the current front-wheel drive shaft rotation information deviates from the reference wheel drive shaft rotation information.

In this way, the parking operation control apparatus 500 and the control methods 600 and 700 thereof according to the second embodiment of the present invention may enhance parking efficiency, convenience and stability by regulating current front-wheel drive shaft rotation information to conform to a wheel-speed range per reference wheel drive shaft rotation information even under a situation in which the current front-wheel drive shaft rotation information is abnormal.

Figure 8:
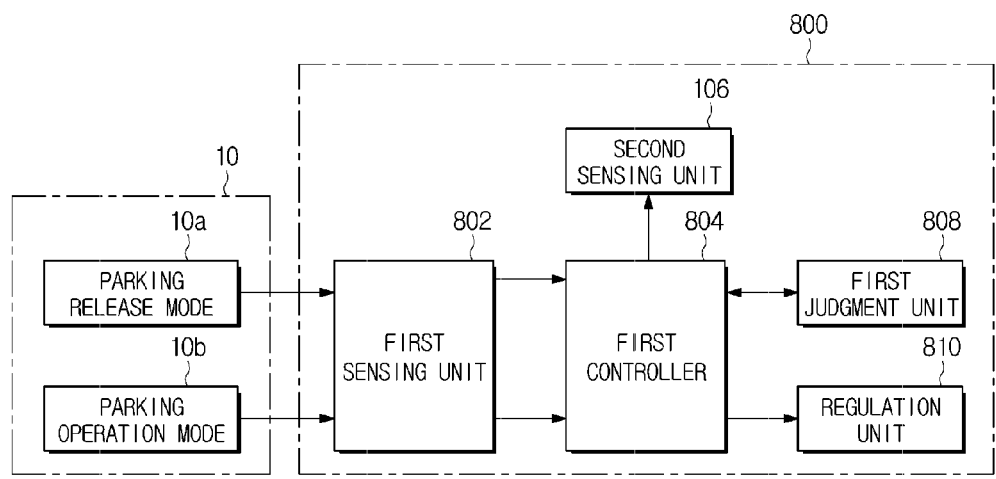
FIG. 8 is a block diagram showing one example of a parking operation control apparatus according to a third embodiment of the present invention.

FIG. 8 is a block diagram showing one example of a parking operation control apparatus according to a third embodiment of the present invention.

Referring to FIG. 8, the parking operation control apparatus 800 according to the third embodiment of the present invention includes a first sensing unit 802, a first controller 804, the second sensing unit 106, a first judgment unit 808 and a regulation unit 810 in the same manner as the parking operation control apparatus (100 in FIG. 2) according to the first embodiment.

Functions of and connection relationships between the respective components of the parking operation control apparatus 800 according to the third embodiment of the present invention are equal to functions of and connection relationships between the respective components of the parking operation control apparatus (100 in FIG. 2) according to the first embodiment and, thus, an additional description thereof will be omitted below.

Here, the first sensing unit 802 of the parking operation control apparatus 800 according to the third embodiment of the present invention serves to further sense current final reduction of the automobile in the parking release mode 10a.

In this case, although not shown, the first sensing unit 802 may include a final reduction sensor (not shown) without being limited thereto and all final reduction sensing means to sense final reduction may be possible.

In addition, in the parking operation control apparatus 800 according to the third embodiment of the present invention, the first controller 804 further stores a preset reference final reduction range and the first judgment unit 808 serves to further judge whether or not the current final reduction of the automobile sensed by the first sensing unit 802 deviates from the reference final reduction range.

In addition, the regulation unit 810 of the parking operation control apparatus 800 according to the third embodiment of the present invention serves to regulate the current final reduction to conform to the reference final reduction range when the first judgment unit 808 judges that the current final reduction of the automobile deviates from the reference final reduction range.

In this case, although not shown, the first controller 804, the first judgment unit 808 and the regulation unit 810 may include a general Electronic Control Unit (ECU) (not shown) or a general Micro Control Unit (MCU) (not shown). The ECU is a main computer applied to the automobile and functions to control and judge general operations and to regulate final reduction. The MCU includes a processor, a memory and an input/output device in a single chip and functions to control and judge general operations and to regulate final reduction. Of course, the disclosure is not limited thereto and all control means, judgment means and regulation means which may control and judge general operations of the automobile and regulate final reduction may be possible.

Here, the first controller 804, the first judgment unit 808 and the regulation unit 810 may constitute an integrated ECU or MCU, or may be discrete ECUs or MCUs.

A parking operation control method to control a parking operation using the parking operation control apparatus 800 according to the third embodiment of the present invention will be described below with reference to FIG. 9.

Figure 9:
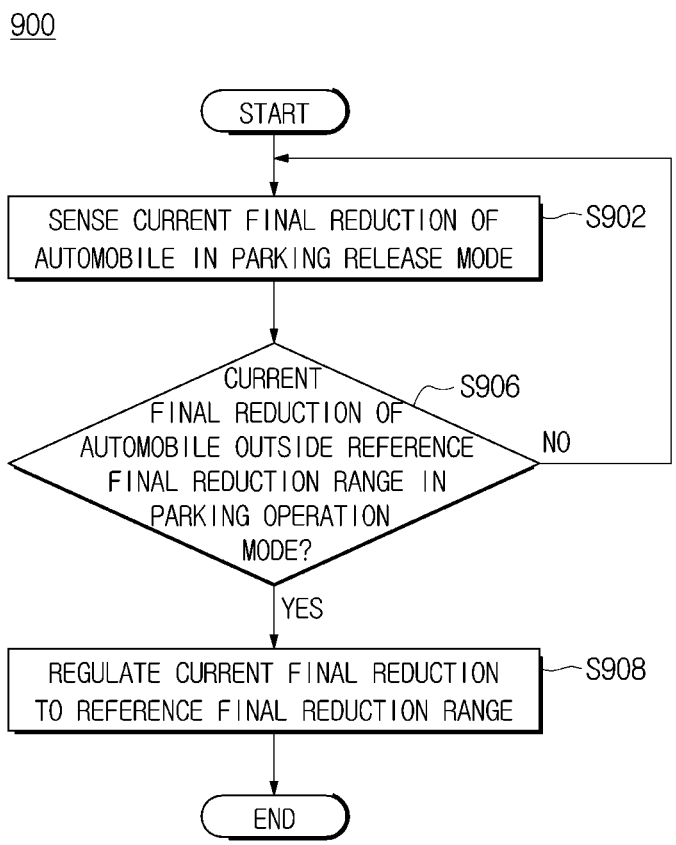
FIG. 9 is a flowchart showing one example of a parking operation control method of the parking operation control apparatus according to the third embodiment of the present invention.

FIG. 9 is a flowchart showing one example of a parking operation control method of the parking operation control apparatus according to the third embodiment of the present invention.

Referring to FIG. 9, the parking operation control method 900 of the parking operation control apparatus (800 in FIG. 8) according to the third embodiment of the present invention includes the third sensing operation (S402 in FIG. 4), the second judgment operation (S406 in FIG. 4) and the second regulation operation (S408 in FIG. 4) in the same manner as the parking operation control method (400 in FIG. 4) of the parking operation control apparatus (100 in FIG. 2) according to the first embodiment.

Functions of and connection relationships between the respective operations corresponding to the parking operation control method 900 of the parking operation control apparatus (800 in FIG. 8) according to the third embodiment of the present invention are equal to functions of and connection relationships between the respective operations corresponding to the parking operation control method (400 in FIG. 4) of the parking operation control apparatus (100 in FIG. 2) according to the first embodiment and, thus, an additional description thereof will be omitted below.

Here, the parking operation control method 900 of the parking operation control apparatus (800 in FIG. 8) according to the third embodiment of the present invention further includes, after the second regulation operation (S408 in FIG. 4), sixth sensing operation S902, fifth judgment operation S906 and fifth regulation operation S908.

First, in the sixth sensing operation S902, the first sensing unit (802 in FIG. 8) senses current final reduction of the automobile in the parking release mode (10a in FIG. 8) of the parking operation device (10 in FIG. 8).

Thereafter, in the fifth judgment operation S906, the first judgment unit (808 in FIG. 8) judges whether or not the current final reduction of the automobile sensed by the first sensing unit (802 in FIG. 8) deviates from a reference final reduction range set in the first controller (804 in FIG. 8) in the parking release mode (10a in FIG. 8) of the parking operation device (10 in FIG. 8).

Finally, in the fifth regulation operation S908, the regulation unit (810 in FIG. 8) regulates the current final reduction to conform to the reference final reduction range when the first judgment unit (808 in FIG. 8) judges that the current final reduction of the automobile deviates from the reference final reduction range.

As described above, according to the third embodiment of the present invention, the parking operation control apparatus 800 includes the first sensing unit 802, the first controller 804, the second sensing unit 106, the first judgment unit 808 and the regulation unit 810 and the control method 900 thereof includes the third sensing operation S402, the second judgment operation S406, the second regulation operation S408, the sixth sensing operation S902, the fifth judgment operation S906 and the fifth regulation operation S908.

Accordingly, the parking operation control apparatus 800 and the control method 900 thereof according to the third embodiment of the present invention may regulate current final reduction to conform to a reference final reduction range when the current final reduction of the automobile deviates from the reference final reduction range.

In this way, the parking operation control apparatus 800 and the control method 900 thereof according to the third embodiment of the present invention may enhance parking efficiency, convenience and stability by regulating current final reduction to conform to a reference final reduction range even under a situation in which the current final reduction is abnormal.

Figure 10:
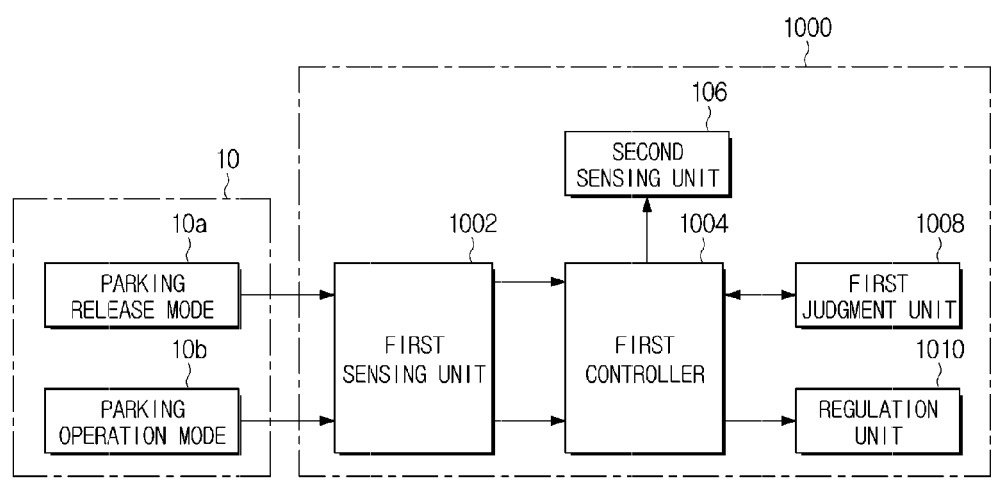
FIG. 10 is a block diagram showing one example of a parking operation control apparatus according to a fourth embodiment of the present invention.

FIG. 10 is a block diagram showing one example of a parking operation control apparatus according to a fourth embodiment of the present invention.

Referring to FIG. 10, the parking operation control apparatus 1000 according to the fourth embodiment of the present invention includes a first sensing unit 1002, a first controller 1004, the second sensing unit 106, a first judgment unit 1008 and a regulation unit 1010, in the same manner as the parking operation control apparatus (100 in FIG. 2) according to the first embodiment.

Functions of and connection relationships between the respective components of the parking operation control apparatus 1000 according to the fourth embodiment of the present invention are equal to functions of and connection relationships between the respective components of the parking operation control apparatus (100 in FIG. 2) according to the first embodiment and, thus, an additional description thereof will be omitted below.

Here, in the parking operation control apparatus 1000 according to the fourth embodiment of the present invention, the first sensing unit 1002 serves to further sense a current yaw rate and current lateral acceleration and the first controller 1004 further stores a preset reference yaw-rate range and a preset reference lateral-acceleration range.

In this case, although not shown, the first sensing unit 1002 may include a yaw-rate sensor (not shown) and a lateral acceleration sensor (not shown) without being limited thereto and all yaw-rate sensing means to sense a yaw-rate and all lateral-acceleration sensing means to sense lateral acceleration may be possible.

In addition, the first judgment unit 1008 of the parking operation control apparatus 1000 according to the fourth embodiment of the present invention serves to further judge whether or not the current yaw rate and current lateral acceleration of the automobile sensed by the first sensing unit 1002 deviate from the reference yaw-rate range and the reference lateral-acceleration range.

In addition, the regulation unit 1010 of the parking operation control apparatus 1000 according to the fourth embodiment of the present invention serves to regulate the current yaw rate and the current lateral acceleration of the automobile to conform to the reference yaw-rate range and the reference lateral-acceleration range when the first judgment unit 1008 judges that the current yaw rate and the current lateral acceleration of the automobile deviate from the reference yaw-rate range and the reference lateral-acceleration range.

In this case, although not shown, the first controller 1004, the first judgment unit 1008 and the regulation unit 1010 may include a general Electronic Control Unit (ECU) (not shown) or a general Micro Control Unit (MCU) (not shown). The ECU is a main computer applied to the automobile and functions to control and judge general operations and to regulate a yaw rate and lateral acceleration of the automobile. The MCU includes a processor, a memory and an input/output device in a single chip and functions to control and judge general operations and to regulate a yaw rate and lateral acceleration of the automobile. Of course, the disclosure is not limited thereto and all control means, judgment means and regulation means which may control and judge general operations of the automobile and regulate a yaw rate and lateral acceleration of the automobile may be possible.

Here, the first controller 1004, the first judgment unit 1008 and the regulation unit 1010 may constitute an integrated ECU or MCU, or may be discrete ECUs or MCUs.

A parking operation control method to control a parking operation using the parking operation control apparatus 1000 according to the fourth embodiment of the present invention will be described below with reference to FIGS. 11 and 12.

Figure 11:
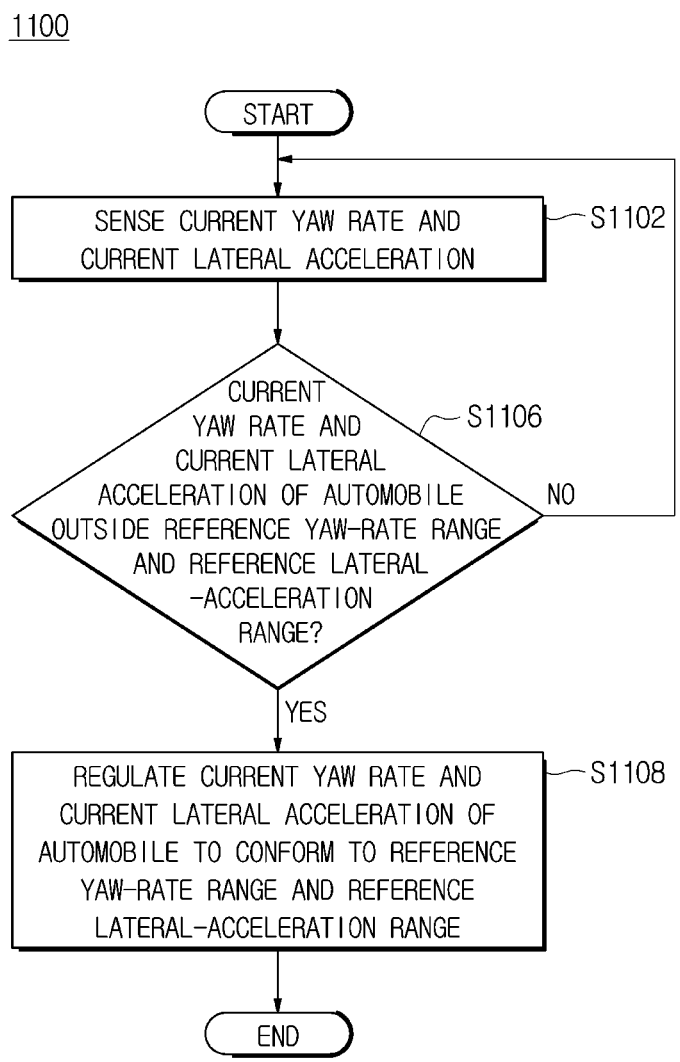
FIG. 11 is a flowchart showing one example of a parking operation control method of the parking operation control apparatus according to the fourth embodiment of the present invention.
Figure 12:
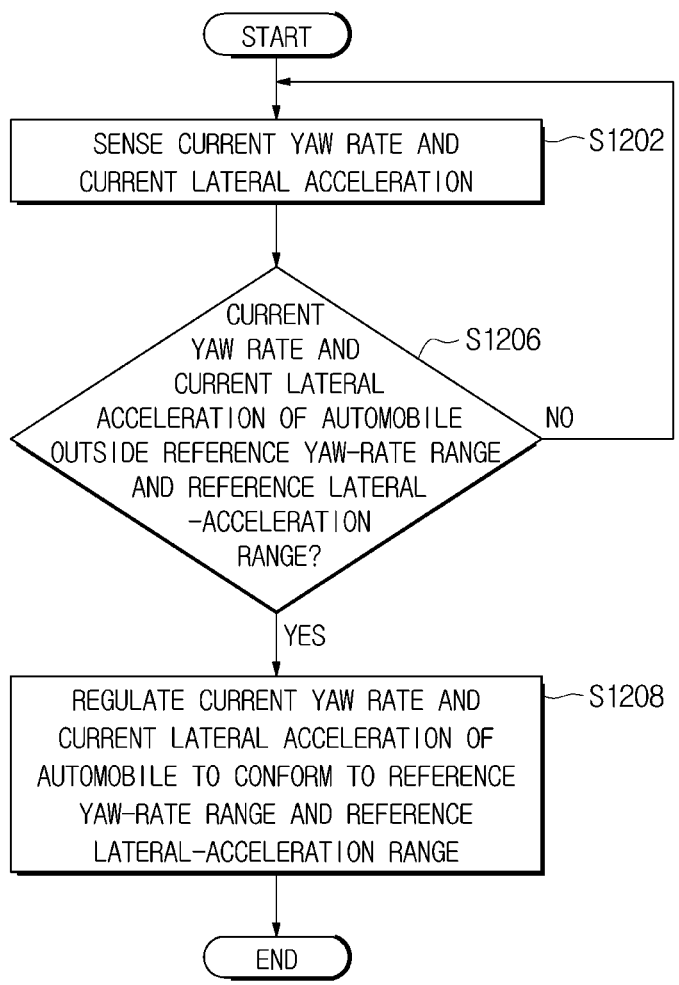
FIG. 12 is a flowchart showing another example of a parking operation control method of the parking operation control apparatus according to the fourth embodiment of the present invention.

FIG. 11 is a flowchart showing one example of a parking operation control method of the parking operation control apparatus according to the fourth embodiment of the present invention and FIG. 12 is a flowchart showing another example of a parking operation control method of the parking operation control apparatus according to the fourth embodiment of the present invention.

Referring to FIGS. 11 and 12, in the same manner as the parking operation control methods (300 and 400 in FIGS. 3 and 4) of the parking operation control apparatus (100 in FIG. 2) according to the first embodiment, the parking operation control methods 1100 and 1200 of the parking operation control apparatus (1000 in FIG. 10) according to the fourth embodiment of the present invention include the first sensing operation (S302 in FIG. 3), the second sensing operation (S304 in FIG. 3), the first judgment operation (S306 in FIG. 3) and the first regulation operation (S308 in FIG. 3), or the third sensing operation (S402 in FIG. 4), the second judgment operation (S406 in FIG. 4) and the second regulation operation (S408 in FIG. 4).

Functions of and connection relationships between the respective operations corresponding to the parking operation control methods 1100 and 1200 of the parking operation control apparatus (1000 in FIG. 10) according to the fourth embodiment of the present invention are equal to functions of and connection relationships between the respective operations corresponding to the parking operation control methods (300 and 400 in FIGS. 3 and 4) of the parking operation control apparatus (100 in FIG. 2) according to the first embodiment and, thus, an additional description thereof will be omitted below.

Here, the parking operation control method 1100 of the parking operation control apparatus (1000 in FIG. 10) according to the fourth embodiment of the present invention further includes, after the first regulation operation (S308 in FIG. 3), seventh sensing operation S1102, sixth judgment operation S1106 and sixth regulation operation S1108.

First, in the seventh sensing operation S1102, the first sensing unit 1002 of FIG. 10) senses a current yaw rate and current lateral acceleration.

Thereafter, in the sixth judgment operation S1106, the first judgment unit (1008 in FIG. 10) judges whether or not the current yaw rate and the current lateral acceleration sensed by the first sensing unit (1002 in FIG. 10) deviate from a reference yaw-rate range and a reference lateral-acceleration range.

Finally, in the sixth regulation operation S1108, the regulation unit (1010 in FIG. 10) regulates the current yaw rate and the current lateral acceleration of the automobile to conform to the reference yaw-rate range and the reference lateral-acceleration range when the first judgment unit (1008 in FIG. 10) judges that the current yaw rate and the current lateral acceleration of the automobile deviate from the reference yaw-rate range and the reference lateral-acceleration range.

On the other hand, the parking operation control method 1200 of the parking operation control apparatus (1000 in FIG. 10) according to the fourth embodiment of the present invention further includes, after the second regulation operation (S408 in FIG. 4), ninth sensing operation S1202, eighth judgment operation S1206 and eighth regulation operation S1208.

First, in the ninth sensing operation S1202, the first sensing unit (1002 in FIG. 10) senses a current yaw rate and current lateral acceleration.

Thereafter, in the eighth judgment operation S1206, the first judgment unit (1008 in FIG. 10) judges whether or not the current yaw rate and the current lateral acceleration sensed by the first sensing unit (1002 in FIG. 10) deviate from a reference yaw-rate range and a reference lateral-acceleration range.

Finally, in the eighth regulation operation S1208, the regulation unit (1010 in FIG. 10) regulates the current yaw rate and the current lateral acceleration of the automobile to conform to the reference yaw-rate range and the reference lateral-acceleration range when the first judgment unit (1008 in FIG. 10) judges that the current yaw rate and the current lateral acceleration of the automobile deviate from the reference yaw-rate range and the reference lateral-acceleration range.

As described above, according to the fourth embodiment of the present invention, the parking operation control apparatus 1000 includes the first sensing unit 1002, the second sensing unit 106, the first judgment unit 1008 and the regulation unit 1010 and the control methods 1100 and 1200 thereof include the first sensing operation S302, the second sensing operation S304, the first judgment operation S306, the first regulation operation S308, the seventh sensing operation S1102, the sixth judgment operation S1106 and the sixth regulation operation S1108, or the third sensing operation S402, the second judgment operation S406, the second regulation operation S408, the ninth sensing operation S1202, the eighth judgment operation S1206 and the eighth regulation operation S1208.

Accordingly, the parking operation control apparatus 1000 and the control methods 1100 and 1200 thereof according to the fourth embodiment of the present invention may regulate a current yaw rate and current lateral acceleration of the automobile to conform to a reference yaw-rate range and a reference lateral-acceleration range when the current yaw rate and the current lateral acceleration of the automobile deviate from the reference yaw-rate range and the reference lateral-acceleration range.

In this way, the parking operation control apparatus 1000 and the control methods 1100 and 1200 thereof according to the fourth embodiment of the present invention may enhance parking efficiency, convenience and stability by regulating a current yaw rate and current lateral acceleration of the automobile to conform to a reference yaw-rate range and a reference lateral-acceleration range even under a situation in which the current yaw rate and current lateral acceleration of the automobile are abnormal.

Figure 13:
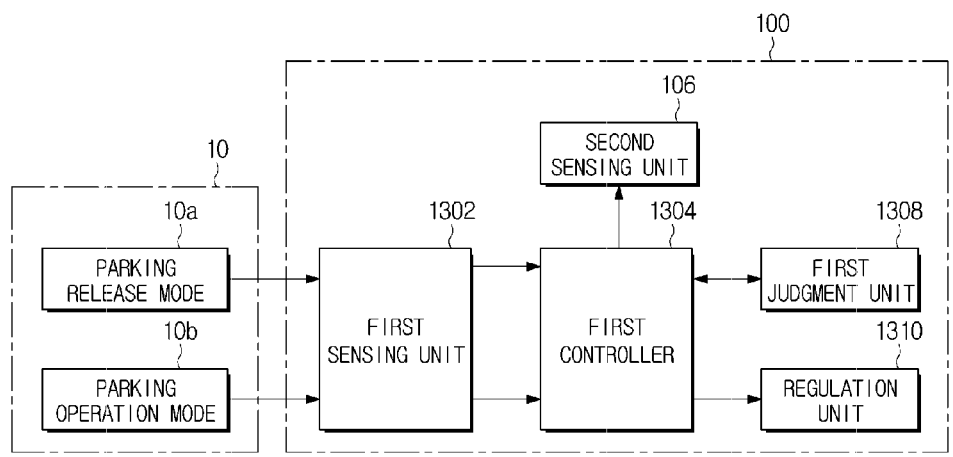
FIG. 13 is a block diagram showing one example of a parking operation control apparatus according to a fifth embodiment of the present invention.

FIG. 13 is a block diagram showing one example of a parking operation control apparatus according to a fifth embodiment of the present invention.

Referring to FIG. 13, the parking operation control apparatus 1300 according to the fifth embodiment of the present invention includes a first sensing unit 1302, a first controller 1304, the second sensing unit 106, a first judgment unit 1308 and a regulation unit 1310, in the same manner as the parking operation control apparatus (1000 in FIG. 10) according to the fourth embodiment.

Functions of and connection relationships between the respective components of the parking operation control apparatus 1300 according to the fifth embodiment of the present invention are equal to functions of and connection relationships between the respective components of the parking operation control apparatus (1000 in FIG. 10) according to the first embodiment and, thus, an additional description thereof will be omitted below.

Here, the first controller 1304 of the parking operation control apparatus 1300 according to the fifth embodiment of the present invention further stores a preset first parking-force level range.

In this case, the regulation unit 1310 of the parking operation control apparatus 1300 according to the fifth embodiment of the present invention serves to reduce parking force of the automobile to conform to the first parking-force level range so as to stabilize the automobile when the first judgment unit 1308 judges that the current yaw rate and the current lateral acceleration of the automobile deviate from the reference yaw-rate range and the reference lateral-acceleration range.

Here, although not shown, the first controller 1304, the first judgment unit 1308 and the regulation unit 1310 may include a general Electronic Control Unit (ECU) (not shown) or a general Micro Control Unit (MCU) (not shown). The ECU is a main computer applied to the automobile and functions to control and judge general operations and to regulate a parking-force level of the automobile. The MCU includes a processor, a memory and an input/output device in a single chip and functions to control and judge general operations and to regulate a parking-force level of the automobile. Of course, the disclosure is not limited thereto and all control means, judgment means and regulation means which may control and judge general operations of the automobile and regulate a parking-force level of the automobile may be possible.

Here, the first controller 1304, the first judgment unit 1308 and the regulation unit 1310 may constitute an integrated ECU or MCU, or may be discrete ECUs or MCUs.

A parking operation control method to control a parking operation using the parking operation control apparatus 1300 according to the fifth embodiment of the present invention will be described below with reference to FIGS. 14 and 15.

Figure 14:
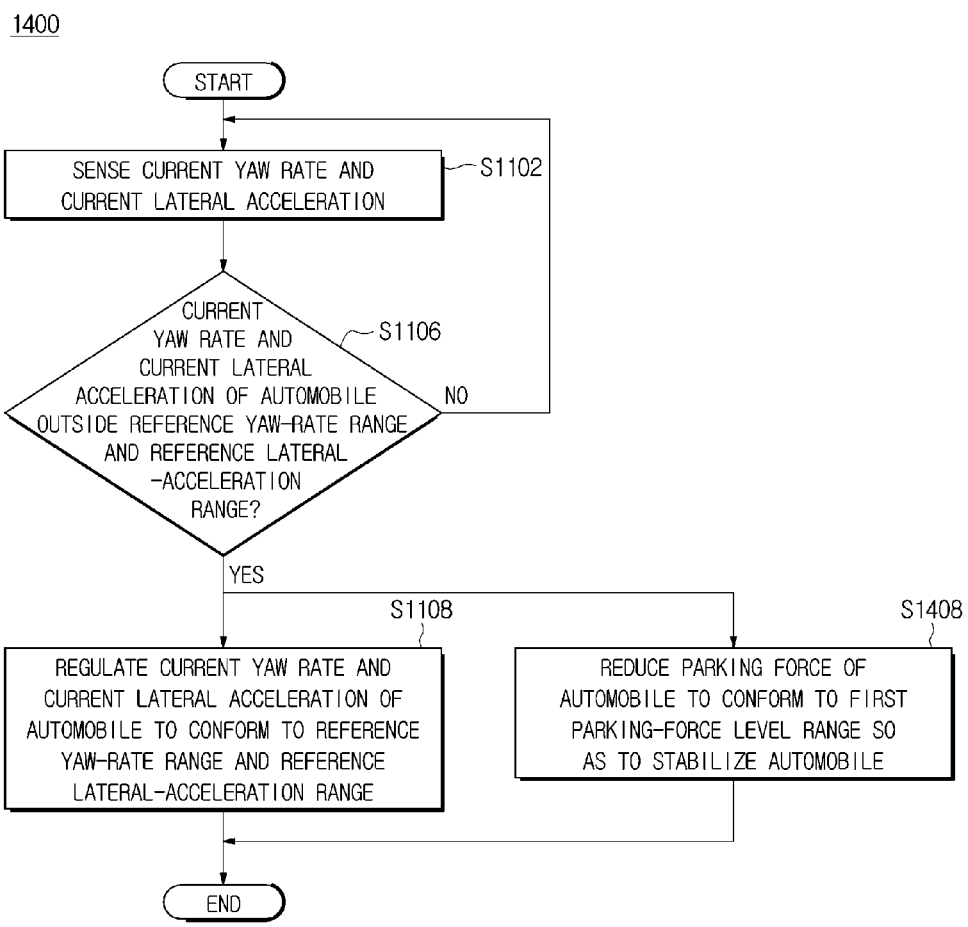
FIG. 14 is a flowchart showing one example of a parking operation control method of the parking operation control apparatus according to the fifth embodiment of the present invention.
Figure 15:
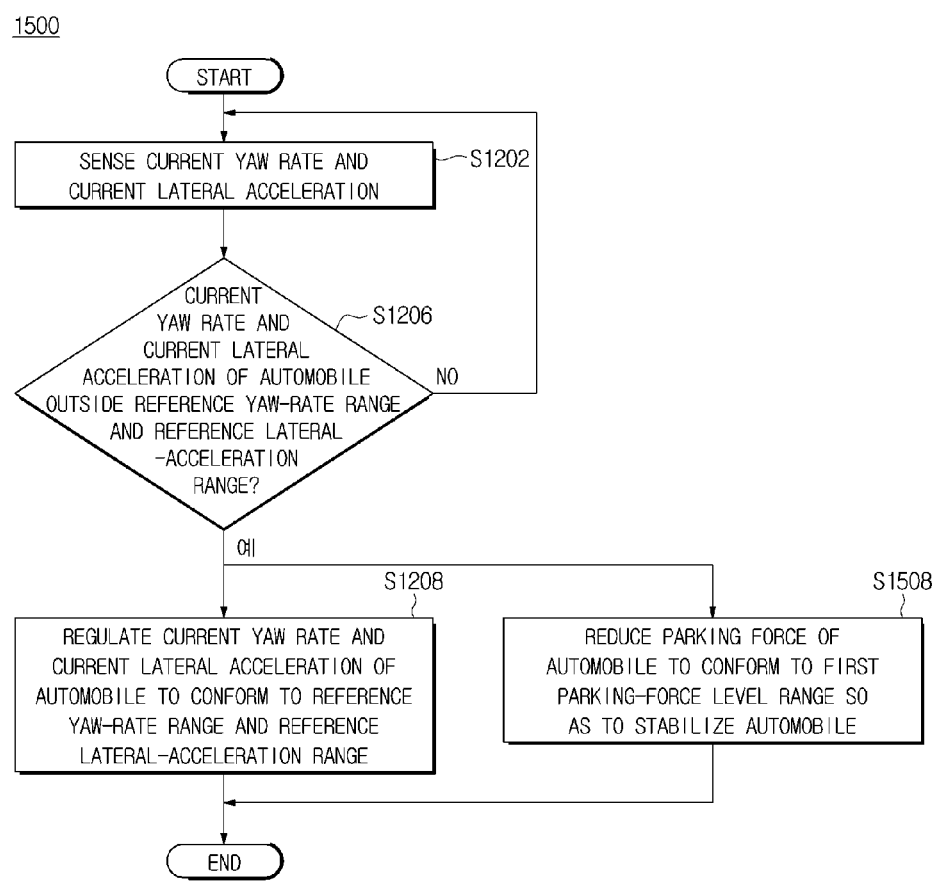
FIG. 15 is a flowchart showing another example of a parking operation control method of the parking operation control apparatus according to the fifth embodiment of the present invention.

FIG. 14 is a flowchart showing one example of a parking operation control method of the parking operation control apparatus according to the fifth embodiment of the present invention and FIG. 15 is a flowchart showing another example of a parking operation control method of the parking operation control apparatus according to the fifth embodiment of the present invention.

Referring to FIGS. 14 and 15, in the same manner as the parking operation control methods (1100 and 1200 in FIGS. 11 and 12) of the parking operation control apparatus (1000 in FIG. 10) according to the fourth embodiment, the parking operation control methods 1400 and 1500 of the parking operation control apparatus (1300 in FIG. 13) according to the fifth embodiment of the present invention include the seventh sensing operation S1102, the sixth judgment operation S1106 and sixth regulation operation S1408, or the ninth sensing operation S1202, the eighth judgment operation S1206 and eighth regulation operation S1508.

Functions of and connection relationships between the respective operations corresponding to the parking operation control methods 1400 and 1500 of the parking operation control apparatus (1300 in FIG. 13) according to the fifth embodiment of the present invention are equal to functions of and connection relationships between the respective operations corresponding to the parking operation control methods (1100 and 1200 in FIGS. 11 and 12) of the parking operation control apparatus (1000 in FIG. 10) according to the fourth embodiment and, thus, an additional description thereof will be omitted below.

Here, as exemplarily shown in FIG. 14, in the sixth regulation operation S1408 of the parking operation control method 1400 of the parking operation control apparatus (1300 in FIG. 13) according to the fifth embodiment of the present invention, the regulation unit (1310 in FIG. 13) reduces parking force of the automobile to conform to a first parking-force level range set in the first controller (1304 in FIG. 13) to stabilize the automobile when the first judgment unit (1308 in FIG. 13) judges that a current yaw rate and current lateral acceleration of the automobile deviate from a reference yaw-rate range and a reference lateral-acceleration range.

On the other hand, as exemplarily shown in FIG. 15, in the eighth regulation operation S1508 of the parking operation control method 1500 of the parking operation control apparatus (1300 in FIG. 13) according to the fifth embodiment of the present invention, the regulation unit (1310 in FIG. 13) reduces parking force of the automobile to conform to a first parking-force level range set in the first controller (1304 in FIG. 13) to stabilize the automobile when the first judgment unit (1308 in FIG. 13) judges that a current yaw rate and current lateral acceleration of the automobile deviate from a reference yaw-rate range and a reference lateral-acceleration range.

As described above, according to the fifth embodiment of the present invention, the parking operation control apparatus 1300 includes the first sensing unit 1302, the first controller 1304, the second sensing unit 106, the first judgment unit 1308 and the regulation unit 1310 and the control methods 1400 and 1500 thereof include the first sensing operation S302, the second sensing operation S304, the first judgment operation S306, the first regulation operation S308, the seventh sensing operation S1102, the sixth judgment operation S1106 and the sixth regulation operations S1108 and S1408, or the third sensing operation S402, the second judgment operation S406, the second regulation operation S408, the ninth sensing operation S1202, the eighth judgment operation S1206 and the eighth regulation operations S1208 and S1508.

Accordingly, the parking operation control apparatus 1300 and the control methods 1400 and 1500 thereof according to the fifth embodiment of the present invention may reduce parking force of the automobile to conform to a first parking-force level range so as to stabilize the automobile when a current yaw rate and current lateral acceleration of the automobile deviate from a reference yaw-rate range and a reference lateral-acceleration range.

In this way, the parking operation control apparatus 1300 and the control methods 1400 and 1500 thereof according to the fifth embodiment of the present invention may enhance parking efficiency, convenience and stability by reducing parking force of the automobile to conform to a first parking-force level range so as to stabilize the automobile even under a situation in which the current yaw rate and the current lateral acceleration of the automobile are abnormal.

Figure 16:
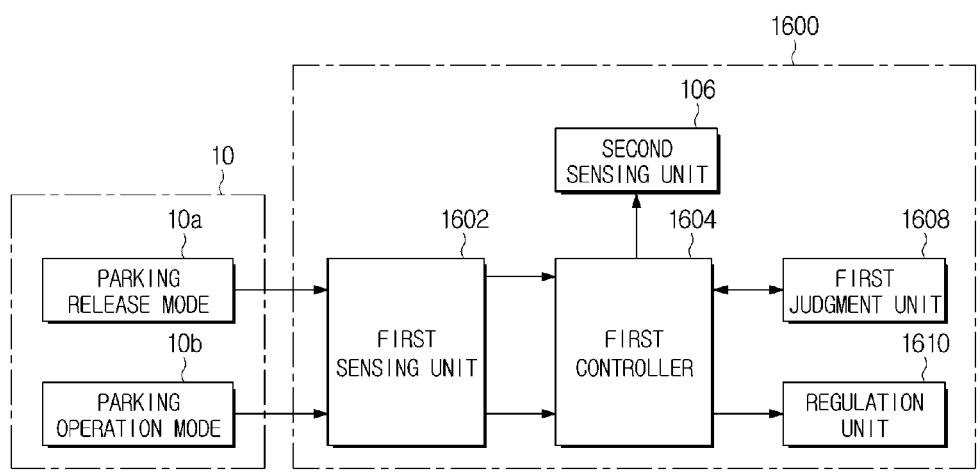
FIG. 16 is a block diagram showing one example of a parking operation control apparatus according to a sixth embodiment of the present invention.

FIG. 16 is a block diagram showing one example of a parking operation control apparatus according to a sixth embodiment of the present invention.

Referring to FIG. 16, the parking operation control apparatus 1600 according to the sixth embodiment of the present invention includes a first sensing unit 1602, a first controller 1604, the second sensing unit 106, a first judgment unit 1608 and a regulation unit 1610, in the same manner as the parking operation control apparatus (1000 in FIG. 10) according to the fourth embodiment.

Functions of and connection relationships between the respective components of the parking operation control apparatus 1600 according to the sixth embodiment of the present invention are equal to functions of and connection relationships between the respective components of the parking operation control apparatus (1000 in FIG. 10) according to the fourth embodiment and, thus, an additional description thereof will be omitted below.

Here, the first sensing unit 1602 of the parking operation control apparatus 1600 according to the sixth embodiment of the present invention serves to further sense current speed-reduction of the automobile.

In this case, although not shown, the first sensing unit 1602 may include a speed-reduction sensor (not shown) without being limited thereto, and all speed-reduction sensors to sense speed-reduction may be possible.

In addition, the first controller 1604 of the parking operation control apparatus 1600 according to the sixth embodiment of the present invention further stores a preset second parking-force level range and a target speed-reduction range.

In addition, when the first judgment unit 1608 judges that the current yaw rate and the current lateral acceleration of the automobile fall within the reference yaw-rate range and the reference lateral-acceleration range, the regulation unit 1610 of the parking operation control apparatus 1600 according to the sixth embodiment of the present invention serves to increase parking force of the automobile to conform to the second parking-force level range and to maintain the increased parking force of the automobile conforming to the second parking-force level range when current speed-reduction of the automobile reaches the target speed-reduction range.

Here, current lateral acceleration may be used to determine a given magnitude of offset variation per hour and may be calculated by multiplying the square of vehicle velocity by a turn radius and dividing the same by the square of time.

In this case, the first controller 1604, the first judgment unit 1608 and the regulation unit 1610 may include a general Electronic Control Unit (ECU) (not shown) or a general Micro Control Unit (MCU) (not shown). The ECU is a main computer applied to the automobile and functions to control and judge general operations and to regulate a parking-force level of the automobile. The MCU includes a processor, a memory and an input/output device in a single chip and functions to control and judge general operations and to regulate a parking-force level of the automobile. Of course, the disclosure is not limited thereto and all control means, judgment means and regulation means which may control and judge general operations of the automobile and regulate a parking-force level of the automobile are possible.

Here, the first controller 1604, the first judgment unit 1608 and the regulation unit 1610 may constitute an integrated ECU or MCU, or may be discrete ECUs or MCUs.

A parking operation control method to control a parking operation using the parking operation control apparatus 1600 according to the sixth embodiment of the present invention will be described below with reference to FIGS. 17 and 18.

Figure 17:
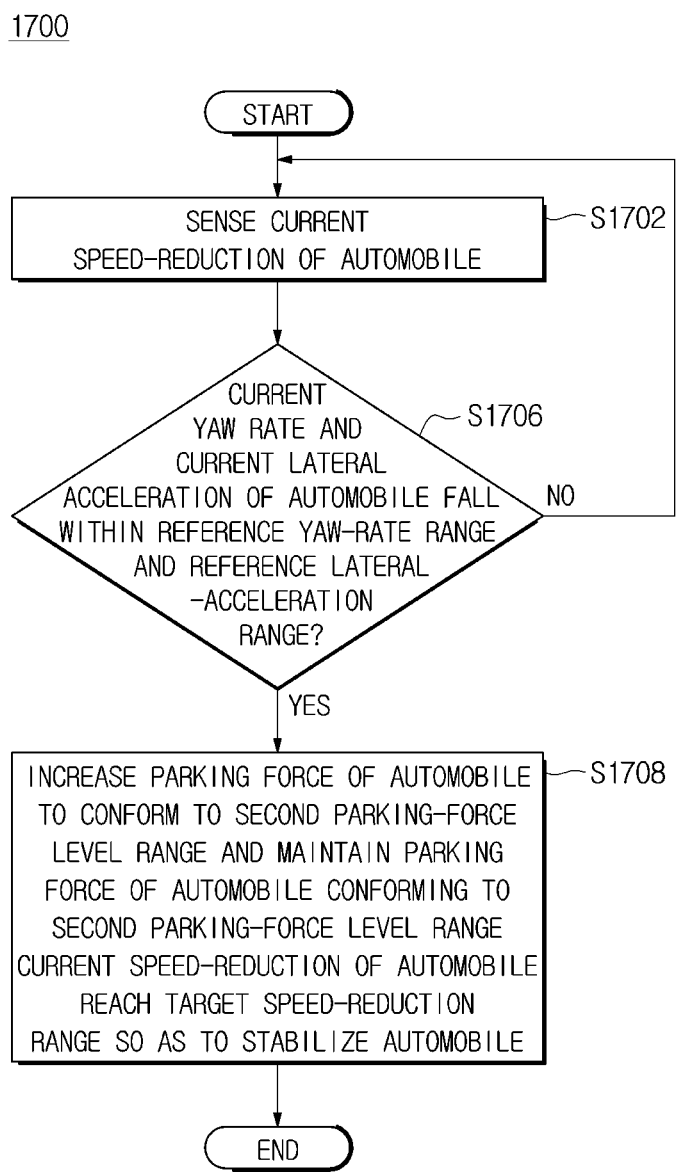
FIG. 17 is a flowchart showing one example of a parking operation control method of the parking operation control apparatus according to the sixth embodiment of the present invention.
Figure 18:
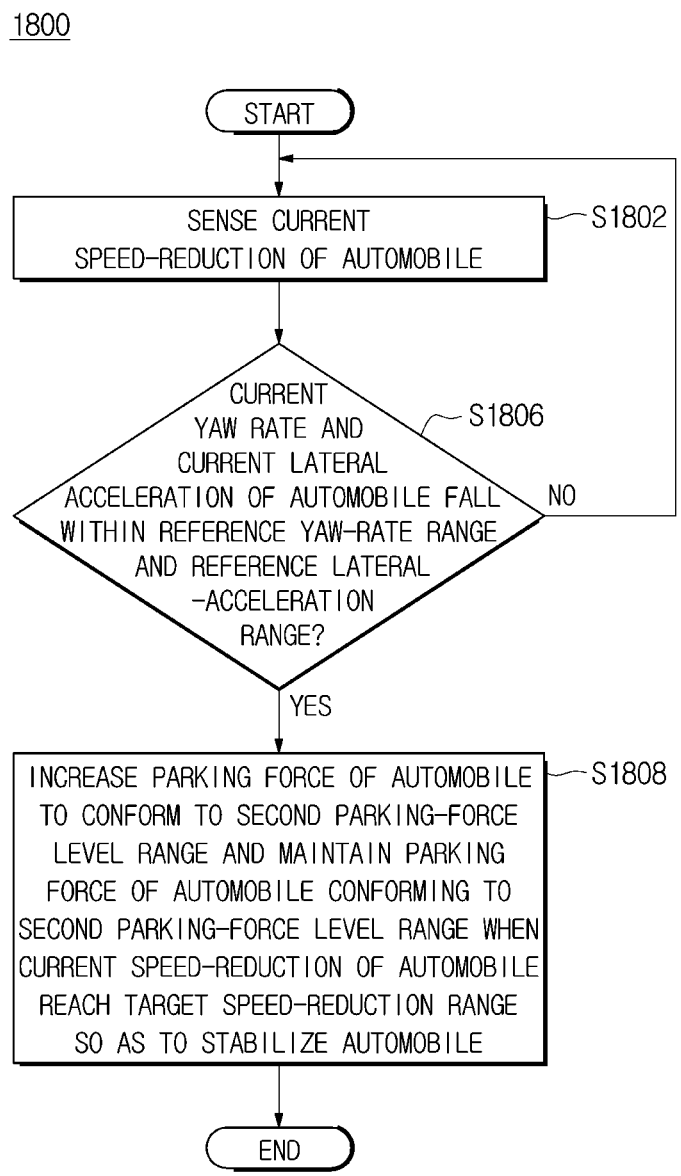
FIG. 18 is a flowchart showing another example of a parking operation control method of the parking operation control apparatus according to the sixth embodiment of the present invention.

FIG. 17 is a flowchart showing one example of a parking operation control method of the parking operation control apparatus according to the sixth embodiment of the present invention, and FIG. 18 is a flowchart showing another example of a parking operation control method of the parking operation control apparatus according to the sixth embodiment of the present invention.

Referring to FIGS. 17 and 18, in the same manner as the parking operation control methods (1100 and 1200 in FIGS. 11 and 12) of the parking operation control apparatus (1000 in FIG. 10) according to the fourth embodiment, the parking operation control methods 1700 and 1800 of the parking operation control apparatus (1600 in FIG. 16) according to the sixth embodiment of the present invention include the seventh sensing operation S1102, the sixth judgment operation S1106 and the sixth regulation operation S1408, or the ninth sensing operation S1202, the eighth judgment operation S1206 and the eighth regulation operation S1508.

Functions of and connection relationships between the respective operations corresponding to the parking operation control methods 1700 and 1800 of the parking operation control apparatus (1600 in FIG. 16) according to the sixth embodiment of the present invention are equal to functions of and connection relationships between the respective operations corresponding to the parking operation control methods (1100 and 1200 in FIGS. 11 and 12) of the parking operation control apparatus (1000 in FIG. 10) according to the fourth embodiment and, thus, an additional description thereof will be omitted below.

Here, as exemplarily shown in FIG. 17, the parking operation control method 1700 of the parking operation control apparatus (1600 in FIG. 16) according to the sixth embodiment of the present invention further includes, after the sixth regulation operation (S1108 in FIG. 11), eighth sensing operation S1702, seventh judgment operation S1706 and seventh regulation operation S1708.

First, in the eighth sensing operation S1702, the first sensing unit (1602 in FIG. 16) senses current speed-reduction of the automobile.

Thereafter, in the seventh judgment operation S1706, the first judgment unit (1608 in FIG. 16) judges whether or not a current yaw rate and current lateral acceleration of the automobile fall within a reference yaw-rate range and a reference lateral-acceleration range.

Finally, when the first judgment unit (1608 in FIG. 16) judges that the current yaw rate and the current lateral acceleration of the automobile fall within the reference yaw-rate range and the reference lateral-acceleration range, in the seventh regulation operation S1708, the regulation unit (1610 in FIG. 16) increases parking force of the automobile to conform to a second parking-force level range set in the first controller (1604 in FIG. 16) and maintains the increased parking force of the automobile conforming to the second parking-force level range when current speed-reduction of the automobile reaches a target speed-reduction range set in the first controller (1604 in FIG. 16), so as to stabilize the automobile.

On the other hand, as exemplarily shown in FIG. 18, the parking operation control method 1800 of the parking operation control apparatus (1600 in FIG. 16) according to the sixth embodiment of the present invention further includes, after the eighth regulation operation (S1208 in FIG. 12), tenth sensing operation S1802, ninth judgment operation S1806 and ninth regulation operation S1808.

First, in the tenth sensing operation S1802, the first sensing unit (1602 in FIG. 16) senses current speed-reduction of the automobile.

Thereafter, in the ninth judgment operation S1806, the first judgment unit (1608 in FIG. 16) judges whether or not a current yaw rate and current lateral acceleration of the automobile fall within a reference yaw-rate range and a reference lateral-acceleration range.

Finally, when the first judgment unit (1608 in FIG. 16) judges that the current yaw rate and the current lateral acceleration of the automobile fall within the reference yaw-rate range and the reference lateral-acceleration range, in the ninth regulation operation S1808, the regulation unit (1610 in FIG. 16) increases parking force of the automobile to conform to a second parking-force level range set in the first controller (1604 in FIG. 16) and maintains the increased parking force of the automobile conforming to the second parking-force level range when current speed-reduction of the automobile reaches a target speed-reduction range set in the first controller (1604 in FIG. 16), so as to stabilize the automobile.

As described above, according to the sixth embodiment of the present invention, the parking operation control apparatus 1600 includes the first sensing unit 1602, the first controller 1604, the second sensing unit 106, the first judgment unit 1608 and the regulation unit 1610 and the control methods 1700 and 1800 thereof include the first sensing operation S302, the second sensing operation S304, the first judgment operation S306, the first regulation operation S308, the seventh sensing operation S1102, the sixth judgment operation S1106, the sixth regulation operation S1108, the eighth sensing operation S1702, the seventh judgment operation S1706 and the seventh regulation operation S1708, or the third sensing operation S402, the second judgment operation S406, the second regulation operation S408, the ninth sensing operation S1202, the eighth judgment operation S1206, the eighth regulation operations S1208, the tenth sensing operation S1802, the ninth judgment operation S1806 and the ninth regulation operation S1808.

Accordingly, the parking operation control apparatus 1600 and the control methods 1700 and 1800 thereof according to the sixth embodiment of the present invention may increase parking force of the automobile to conform to a second parking-force level range and maintain the increased parking force of the automobile conforming to the second parking-force range when current speed-reduction of the automobile reaches a target speed-reduction range so as to stabilize the automobile when a current yaw rate and current lateral acceleration of the automobile fall within a reference yaw-rate range and a reference lateral-acceleration range.

In this way, the parking operation control apparatus 1600 and the control methods 1700 and 1800 thereof according to the sixth embodiment of the present invention may enhance parking efficiency, convenience and stability by increasing parking force of the automobile to conform to a second parking-force level range and maintain the increased parking force of the automobile conforming to the second parking-force range when current speed-reduction of the automobile reaches a target speed-reduction range so as to stabilize the automobile even under a situation in which the current yaw rate and the current lateral acceleration of the automobile are abnormal.

As is apparent from the above description, a parking operation control apparatus and a control method thereof according to the present invention may achieve the following effects.

Firstly, at least one current wheel speed may be regulated to conform to a reference wheel-speed range under a situation in which the at least one current wheel speed is abnormal, which has the effect of enhancing parking efficiency, convenience and stability.

Secondly, current front-wheel drive shaft rotation information may be regulated to conform to a wheel-speed range per reference wheel drive shaft rotation information under a situation in which the current front-wheel drive shaft rotation information is abnormal, which has the effect of enhancing parking efficiency, convenience and stability.

Thirdly, current final reduction may be regulated to conform to a reference final reduction range under a situation in which the current final reduction is abnormal, which has the effect of enhancing parking efficiency, convenience and stability.

Fourthly, a current yaw rate and current lateral acceleration of an automobile may be regulated to conform to a reference yaw-rate range and a reference lateral-acceleration range under a situation in which the current yaw rate and the current lateral acceleration are abnormal, which has the effect of enhancing parking efficiency, convenience and stability.

Fifthly, parking force of an automobile may be reduced to conform to a first parking-force level range so as to stabilize the automobile under a situation in which a current yaw rate and current lateral acceleration of the automobile are abnormal, which has the effect of enhancing parking efficiency, convenience and stability.

Sixthly, parking force of an automobile may be reduced to conform to a second parking-force level range and the increased parking force of the automobile conforming to the second parking-force level range may be maintained when current speed-reduction of the automobile reaches a target speed-reduction range so as to stabilize the automobile under a situation in which the current speed-reduction of the automobile is abnormal, which has the effect of enhancing parking efficiency, convenience and stability.

It will be apparent that the above description merely exemplifies the technical spirit, and various modifications, variations, and substitutions may be made by those skilled in the field of medical appliances without departing from the fundamental characteristics of the disclosure. Thus, it should be understood that there is no intent to limit the technical spirit to the disclosed embodiments and the accompanying drawings.

Rather, the disclosed embodiments and the accompanying drawings are provided to explain the technical spirit, and the scope of the disclosure should be defined by the following claims, and all equivalent technical ideas should be construed as falling within the spirit and scope as defined by the claims.

What is claimed is:

1. A parking operation control apparatus, comprising:
a first sensing unit configured to sense at least one current wheel speed of an automobile based on an operating mode of a parking operation device of the automobile,
a first controller configured to receive the at least one current wheel speed sensed by the first sensing unit, to output the at least one current wheel speed, to store a reference wheel-speed range corresponding to a preset reference front-wheel speed range, and to store a preset reference rear-wheel speed range;
a second sensing unit configured to sense the at least one current wheel speed output from the first controller;
a first judgment unit configured to judge whether the at least one current wheel speed sensed by the first sensing unit deviates from the reference wheel-speed range, or to judge whether the at least one current wheel speed sensed by the second sensing unit is not yet output; and
a regulation unit configured to regulate the at least one current wheel speed to conform to the reference wheel-speed range if the first judgment unit judges that the at least one current wheel speed deviates from the reference wheel-speed range or that the at least one current wheel speed is not yet output,
wherein
the first sensing unit is configured to sense a current front-wheel speed and a current rear-wheel speed of the automobile if the parking operation device is in a parking release mode, and
the first sensing unit is configured to sense the current front-wheel speed of the automobile if the parking operation device is in a parking operation mode.

2. The apparatus according to claim 1, wherein
the first sensing unit is further configured to sense a current final reduction of the automobile if the parking operation device is in the parking release mode,
the first controller is further configured to store a preset reference final reduction range,
the first judgment unit is further configured to judge whether the current final reduction of the automobile sensed by the first sensing unit deviates from the reference final reduction range, and
the regulation unit is further configured to regulate the current final reduction to conform to the reference final reduction range if the first judgment unit judges that the current final reduction of the automobile deviates from the reference final reduction range.

3. The apparatus according to claim 1, wherein
the first sensing unit is further configured to sense a current yaw rate and current lateral acceleration of the automobile;
the first controller is further configured to store a preset reference yaw-rate range and a preset reference lateral-acceleration range,
the first judgment unit is further configured to judge whether the current yaw rate and the current lateral acceleration of the automobile sensed by the first sensing unit deviate from the reference yaw-rate range and the reference lateral-acceleration range, and
the regulation unit is further configured to regulate the current yaw rate and the current lateral acceleration of the automobile to conform to the reference yaw-rate range and the reference lateral-acceleration range if the first judgment unit judges that the current yaw rate and the current lateral acceleration of the automobile deviate from the reference yaw-rate range and the reference lateral-acceleration range.

4. The apparatus according to claim 3, wherein
the first controller is further configured to store a preset first parking-force level range, and
the regulation unit is further configured to reduce a parking force of the automobile to conform to the first parking-force level range so as to stabilize the automobile if the first judgment unit judges that the current yaw rate and the current lateral acceleration of the automobile deviate from the reference yaw-rate range and the reference lateral-acceleration range.

5. The apparatus according to claim 4, wherein
the first sensing unit is further configured to sense a current speed-reduction of the automobile,
the first controller is further configured to store a preset second parking-force level range and a target speed-reduction range, and
the regulation unit is further configured to increase the parking force of the automobile to conform to the second parking-force level range and maintains the increased parking force of the automobile conforming to the second parking-force level range if the first sensing unit senses that the current speed-reduction of the automobile reaches the target speed-reduction range so as to stabilize the automobile if the first judgment unit judges that the current yaw rate and the current lateral acceleration of the automobile are within the reference yaw-rate range and the reference lateral-acceleration range.

6. The apparatus according to claim 1, further comprising:
a third sensing unit configured to sense at least one current wheel drive shaft rotation information among current front-wheel drive shaft rotation information and current rear-wheel drive shaft rotation information of the automobile if the first judgment unit judges that the at least one current wheel speed deviates from the reference wheel-speed range or that the at least one current wheel speed is not yet output;
a second controller configured to receive the at least one current wheel drive shaft rotation information sensed by the third sensing unit, wherein the second controller is configured to store reference wheel drive shaft rotation information corresponding to preset reference front-wheel drive shaft rotation information and preset reference rear-wheel drive shaft rotation information, and the second controller is further configured to store a wheel-speed range on a per reference wheel drive shaft rotation information basis; and
a second judgment unit configured to judge whether the at least one current wheel drive shaft rotation information sensed by the third sensing unit deviates from the reference wheel drive shaft rotation information,
wherein the regulation unit is configured to regulate the at least one current wheel drive shaft rotation information to conform to the wheel speed range on a per reference wheel drive shaft rotation information basis if the second judgment unit judges that the at least one current wheel drive shaft rotation information deviates from the reference wheel drive shaft rotation information.

7. A parking operation control method, comprising:
sensing, using a sensing unit, at least one current wheel speed of an automobile based on an operating mode of a parking operation device of the automobile, wherein the sensing unit is configured to sense a current front-wheel speed and a current rear-wheel speed of the automobile if the parking operation device is in a parking release mode, and to sense the current front-wheel speed of the automobile if the parking operation device is in a parking operation mode;

setting a reference wheel-speed range in a first controller;

judging whether the at least one current wheel speed deviates from the reference wheel-speed range; and regulating the at least one current wheel speed to conform to the reference wheel-speed range if the at least one current wheel speed deviates from the reference wheel-speed range.

8. The method according to claim 7, further comprising:

sensing at least one current wheel drive shaft rotation information among current front-wheel drive shaft rotation information and current rear-wheel drive shaft rotation information of the automobile if the at least one current wheel speed deviates from the reference wheel-speed range;

setting reference wheel drive shaft rotation information in a second controller;

judging whether the at least one current wheel drive shaft rotation information deviates from the reference wheel drive shaft rotation information; and regulating the at least one current wheel drive shaft rotation information to conform to a wheel speed range per the reference wheel drive shaft rotation information set in the second controller if the at least one current wheel drive shaft rotation information deviates from the reference wheel drive shaft rotation information.

9. A parking operation control method, comprising:

sensing, using a sensing unit comprising one or more sensors, at least one current wheel speed of an automobile based on an operating mode of a parking operation device of the automobile, wherein the first sensing unit is configured to sense a current front-wheel speed and a current rear-wheel speed of the automobile if the parking operation device is in a parking release mode, and to sense the current front-wheel speed of the automobile if the parking operation device is in a parking operation mode;

judging whether the current front-wheel speed sensed by the sensing unit deviates from a reference front-wheel speed range set in a first controller; and regulating the current front-wheel speed to conform to the reference front-wheel speed range if the current front-wheel speed deviates from the reference front-wheel speed range.

10. The method according to claim 9, further comprising:

sensing current front-wheel drive shaft rotation information of the automobile if the current front-wheel speed deviates from the reference front-wheel speed range;

judging whether the current front-wheel drive shaft rotation information deviates from the reference front-wheel drive shaft rotation information set in a second controller; and regulating the current front-wheel drive shaft rotation information to conform to a wheel speed range per the reference wheel drive shaft rotation information set in the second controller if the current front-wheel drive shaft rotation information deviates from the reference front-wheel drive shaft rotation information.

11. A parking operation control method comprising:

sensing, using a sensing unit comprising one or more sensors, at least one current wheel speed of an automobile based on an operating mode of a parking operation device of the automobile, wherein the first sensing unit is configured to sense a current front-wheel speed and a current rear-wheel speed of the automobile if the parking operation device is in a parking release mode, and to sense the current front-wheel speed of the automobile if the parking operation device is in a parking operation mode;

judging whether the current front-wheel speed sensed by the sensing unit deviates from a reference front-wheel speed range set in a first controller;

sensing a current final reduction of the automobile if the parking operation device is in the parking release mode;

regulating the current front-wheel speed to conform to the reference front-wheel speed range if the current front-wheel speed deviates from the reference front-wheel speed range judging whether the current final reduction of the automobile deviates from a reference final reduction range set in the first controller; and regulating the current final reduction to conform to the reference final reduction range if the current final reduction of the automobile deviates from the reference final reduction range.

12. The method according to claim 7, further comprising:

sensing a current yaw rate and current lateral acceleration of the automobile;

judging whether the current yaw rate and the current lateral acceleration of the automobile deviates from a reference yaw-rate range and a reference lateral-acceleration range; and regulating the current yaw rate and the current lateral acceleration of the automobile to conform to the reference yaw-rate range and the reference lateral-acceleration range if the current yaw rate and the current lateral acceleration of the automobile deviate from the reference yaw-rate range and the reference lateral-acceleration range.

13. The method according to claim 12, wherein regulating the current yaw rate and the current lateral acceleration of the automobile comprises reducing a parking force of the automobile to conform to a first parking-force level range set in the first controller so as to stabilize the automobile if the current yaw rate and the current lateral acceleration of the automobile deviate from the reference yaw-rate range and the reference lateral-acceleration range.

14. The method according to claim 13, further comprising:

sensing a current speed-reduction of the automobile;

judging whether the current yaw rate and the current lateral acceleration of the automobile deviate from the reference yaw-rate range and the reference lateral-acceleration range;

increasing the parking force of the automobile to conform to a second parking-force level range set in the first controller; and maintaining the increased parking force of the automobile conforming to the second parking-force level range if the current speed-reduction of the automobile reaches a target speed-reduction range set in the first controller so as to stabilize the automobile if the current yaw rate and the current lateral acceleration of the automobile are within the reference yaw-rate range and the reference lateral-acceleration range.

15. The method according to claim 9, further comprising:

sensing a current yaw-rate and a current lateral acceleration of the automobile;

judging whether the current yaw rate and the current lateral acceleration of the automobile deviate from a reference yaw-rate range and a reference lateral-acceleration range; and regulating the current yaw rate and the current lateral acceleration of the automobile to conform to the reference yaw-rate range and the reference lateral-acceleration range if the current yaw rate and the current lateral acceleration of the automobile deviate from the reference yaw-rate range and the reference lateral-acceleration range.

16. The method according to claim 15, regulating the current yaw rate and the current lateral acceleration of the automobile comprises reducing a parking force of the automobile to conform to a first parking-force level range set in the first controller so as to stabilize the automobile if the current yaw rate and the current lateral acceleration of the automobile deviate from the reference yaw-rate range and the reference lateral-acceleration range.

17. The method according to claim 16, further comprising:

sensing a current speed-reduction of the automobile;

judging whether the current yaw rate and the current lateral acceleration of the automobile are within the reference yaw-rate range and the reference lateral-acceleration range; and increasing the parking force of the automobile to conform to a second parking-force level range set in the first controller; and maintaining the increased parking force of the automobile conforming to the second parking-force level range if the current speed-reduction of the automobile reaches a target speed-reduction range set in the first controller so as to stabilize the automobile if the current yaw rate and the current lateral acceleration of the automobile are within the reference yaw-rate range and the reference lateral-acceleration range.

* * * * *